US009719881B2

(12) United States Patent
Srivastava et al.

(10) Patent No.: US 9,719,881 B2
(45) Date of Patent: Aug. 1, 2017

(54) SCALABLE FRAMEWORK FOR MANAGING CIVIL STRUCTURE MONITORING DEVICES

(71) Applicant: Verizon Patent and Licensing Inc., Arlington, VA (US)

(72) Inventors: Ashok N. Srivastava, Mountain View, CA (US); Fu-Kuo Chang, Stanford, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 303 days.

(21) Appl. No.: 14/473,129

(22) Filed: Aug. 29, 2014

(65) Prior Publication Data

US 2016/0061687 A1 Mar. 3, 2016

(51) Int. Cl.
G06F 17/18 (2006.01)
G21C 17/00 (2006.01)
G01M 5/00 (2006.01)
G05B 23/02 (2006.01)
B61L 23/04 (2006.01)

(52) U.S. Cl.
CPC ....... G01M 5/0033 (2013.01); G05B 23/0283 (2013.01); *B61L 23/042* (2013.01); *G05B 23/027* (2013.01); *G05B 23/0286* (2013.01); *G05B 2219/31205* (2013.01); *G05B 2219/31434* (2013.01)

(58) Field of Classification Search
CPC .............. G05B 23/027; G05B 23/0286; G05B 2219/31205; G05B 2219/31434; B61L 23/042

USPC ...................... 702/47, 35, 130, 34, 183, 188
See application file for complete search history.

(56) References Cited

U.S. PATENT DOCUMENTS

| 6,768,970 B2 * | 7/2004 | Shimizu | G05B 23/0256 376/215 |
| 7,502,670 B2 * | 3/2009 | Harrison | B61L 23/044 701/1 |
| 2002/0038200 A1 * | 3/2002 | Shimizu | G05B 23/0256 702/188 |

(Continued)

OTHER PUBLICATIONS

Johann Schumann et al., "Toward Software Health Management with Bayesian Networks," Proceedings of the FSE/SDP workshop on Future of software engineering research, Carnegie Mellon University, Nov. 2010, 5 pages.

(Continued)

*Primary Examiner* — Jonathan Dunlap

(57) ABSTRACT

A device receives information, associated with civil structures, that includes temperature information associated with the civil structures, pressure information associated with the civil structures, stress information associated with the civil structures, vibration information associated with the civil structures, or displacement information associated with the civil structures. The device performs an analysis of the information associated with the civil structures via one or more analytics techniques, and generates analysis information based on the analysis of the information associated with the civil structures. The analysis information identifies a potential issue with at least one of the civil structures, and the device provides the analysis information for display.

20 Claims, 14 Drawing Sheets

(56) References Cited

U.S. PATENT DOCUMENTS

| | | | | |
|---|---|---|---|---|
| 2003/0105613 A1* | 6/2003 | Nagafuchi | ............ | G05B 23/027 702/183 |
| 2003/0135349 A1* | 7/2003 | Yoshie | ............... | G05B 23/0275 702/183 |
| 2003/0183018 A1* | 10/2003 | Addink | ................. | A01G 25/16 73/861.69 |
| 2003/0212532 A1* | 11/2003 | Shimizu | ............. | G05B 23/0256 702/188 |
| 2004/0117159 A1* | 6/2004 | Shimizu | ............. | G05B 23/0256 702/188 |
| 2006/0095231 A1* | 5/2006 | Okazaki | ............ | G05B 23/0267 702/183 |
| 2006/0116836 A1* | 6/2006 | Yoshie | ............... | G05B 23/0229 702/85 |
| 2006/0129358 A1* | 6/2006 | Yoshie | ............... | G05B 23/0275 702/188 |
| 2007/0027654 A1* | 2/2007 | Nagafuchi | ............ | G05B 23/027 702/185 |
| 2008/0010039 A1* | 1/2008 | Miyasaka | ................ | G01H 1/00 702/183 |
| 2008/0027659 A1* | 1/2008 | Miyasaka | ................ | G01H 1/00 702/39 |
| 2009/0037144 A1* | 2/2009 | Nagafuchi | ............ | G05B 23/027 702/183 |
| 2009/0282920 A1* | 11/2009 | Sato | ........................ | G01H 1/00 73/597 |
| 2010/0026551 A1* | 2/2010 | Szwilski | ................. | B61K 9/08 342/22 |
| 2010/0089161 A1* | 4/2010 | Taheri | ................. | G01M 7/025 73/588 |
| 2012/0150383 A1* | 6/2012 | Douglas | ................... | G01F 1/00 701/30.5 |
| 2012/0218411 A1* | 8/2012 | Wu | ........................ | G01N 33/42 348/148 |
| 2012/0290251 A1* | 11/2012 | Groeneweg | ............ | B61L 23/042 702/130 |
| 2015/0046099 A1* | 2/2015 | Kamoi | ................... | G06Q 50/06 702/34 |
| 2016/0154129 A1* | 6/2016 | Sayers | ................... | E21B 43/26 702/13 |

OTHER PUBLICATIONS

Ashok N. Srivastava et al., "Machine Learning and Knowledge Discovery for Engineering Systems Health Management", Chapman & Hall/CRC, Data Mining and Knowledge Discovery Series, 2012, 464 pages.

Ashok N. Srivastava et al., "Software health management: a necessity for safety critical systems", Innovations in Systems and Software Engineering, A NASA Journal, ISSN 1614-5046, Springer, May 22, 2013, 17 pages.

Santanu Das et al., "Detecting Anomalies in Multivariate Data Sets with Switching Sequences and Continuous Streams", National Aeronautics and Space Administration (NASA), www.nasa.gov, 2009, 1 page.

Ashok N. Srivastava et al., "Vehicle-Level Reasoning Systems: Integrating System-Wide Data to Estimate the Instantaneous Health State", Society of Automotive Engineers Integrated Vehicle Health Management Book, Ian Jennions, Ed., 2011, 12 pages.

Bryan L. Matthews et al., "Space Shuttle Main Propulsion System Anomaly Detection: A Case Study", IEEE A&E Systems Magazine, Sep. 2011, 10 pages.

* cited by examiner

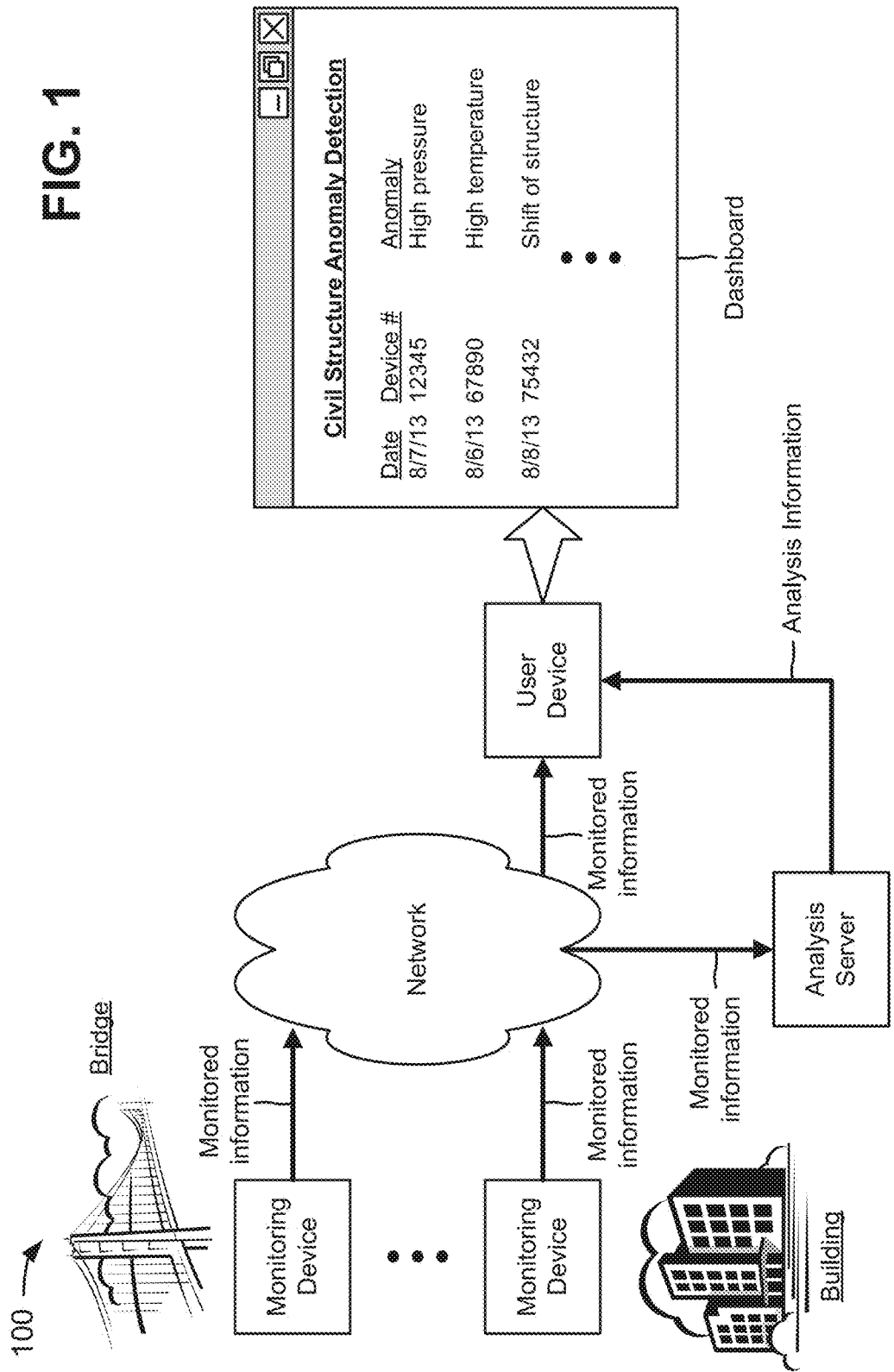

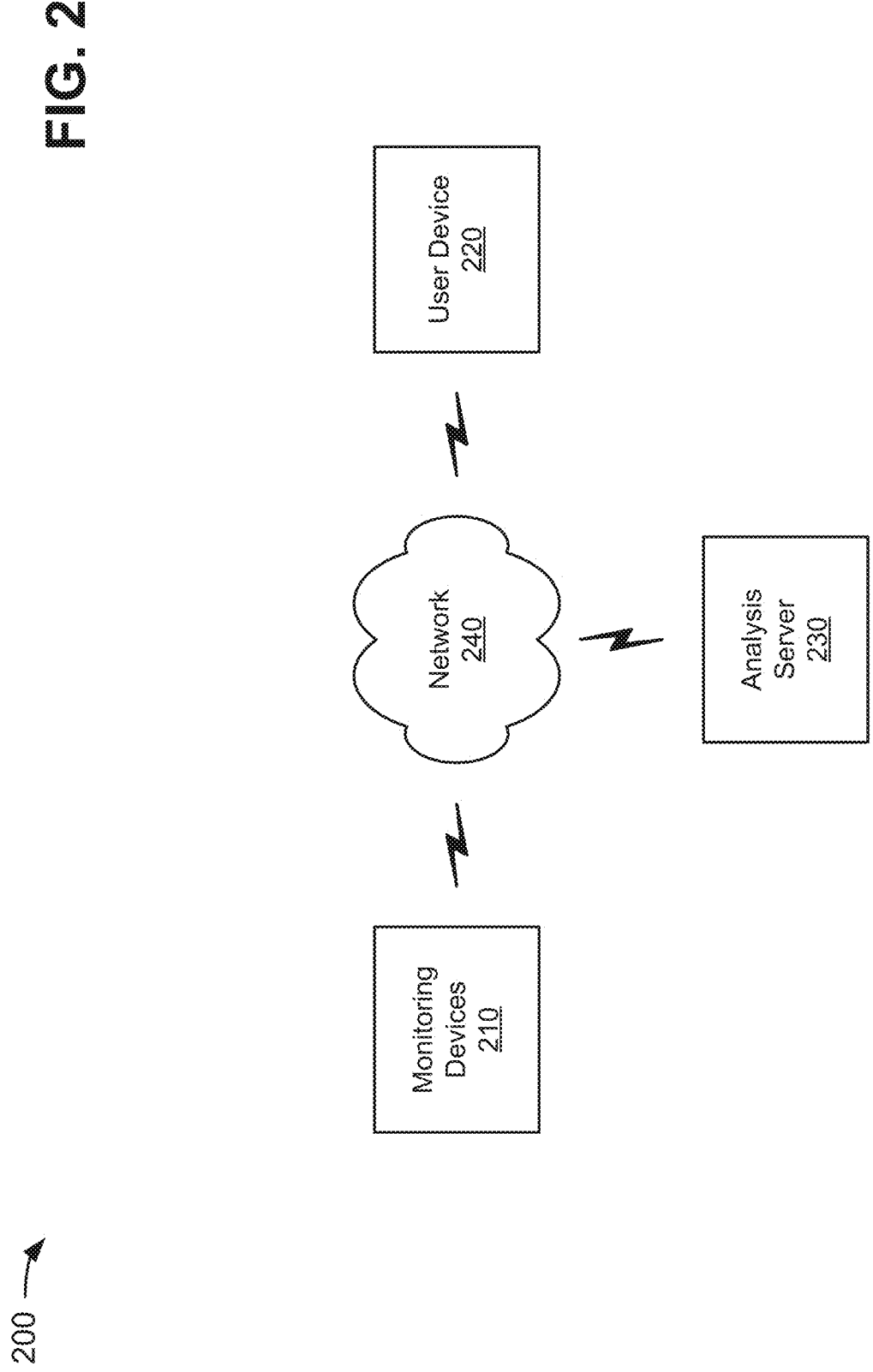

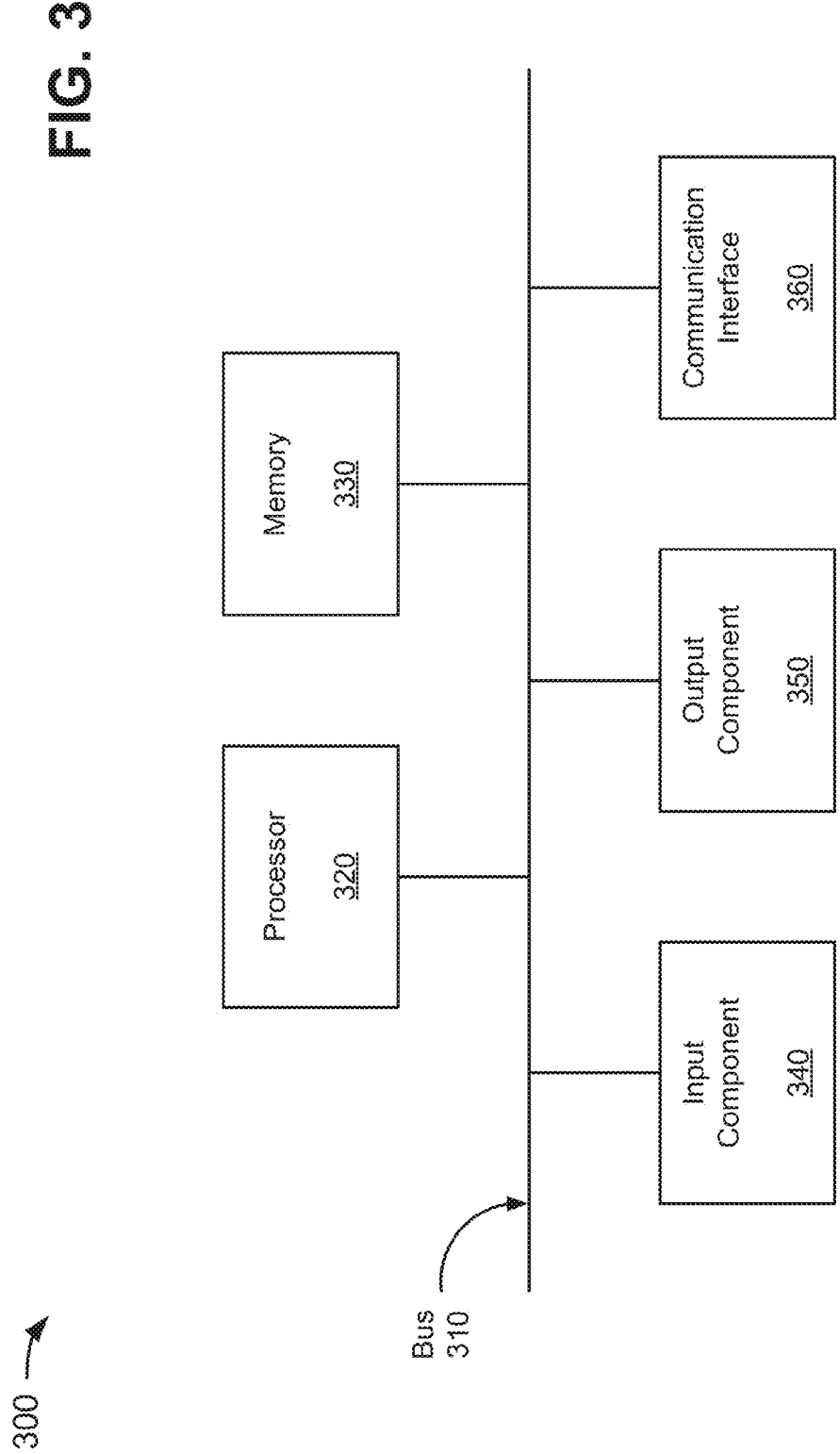

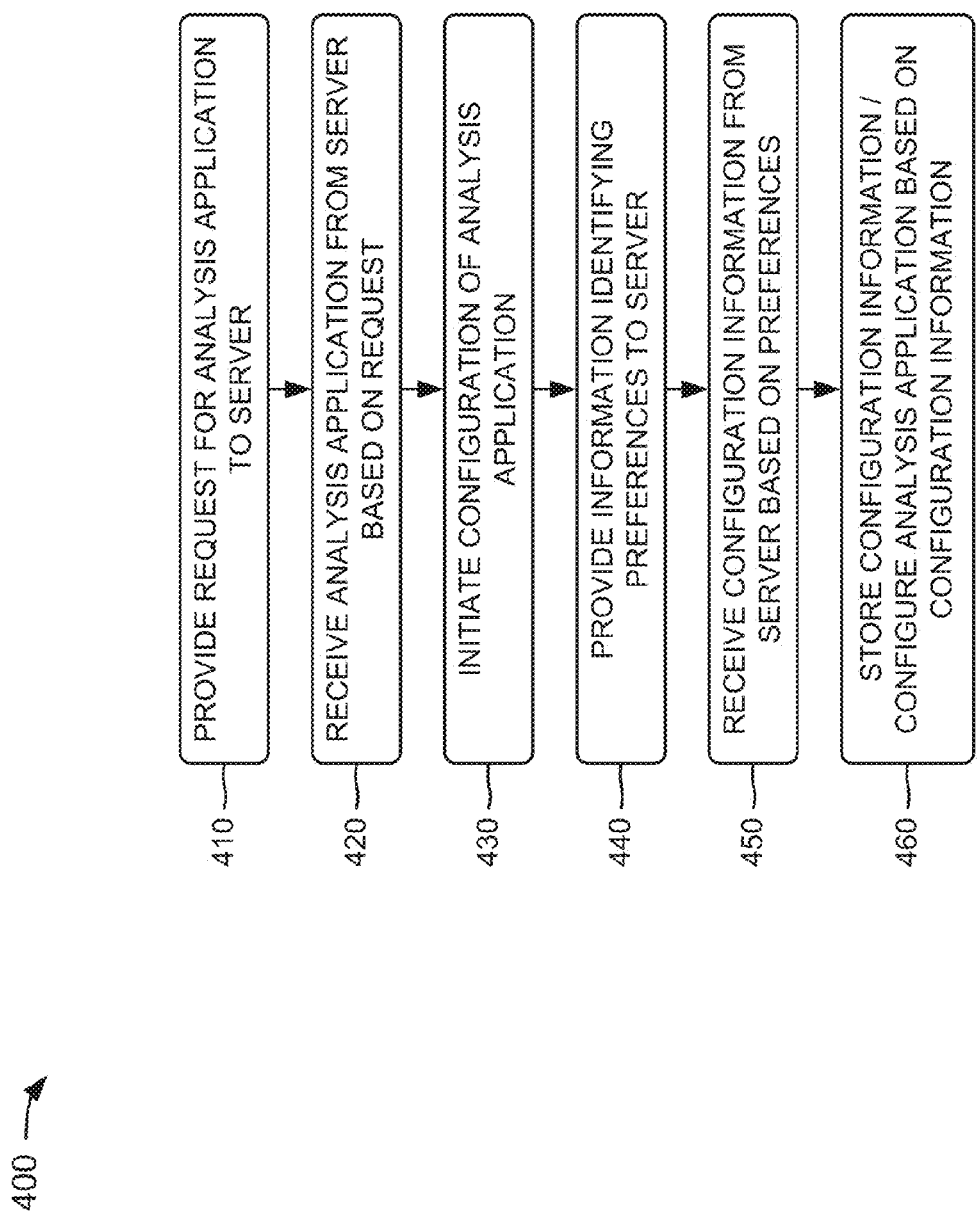

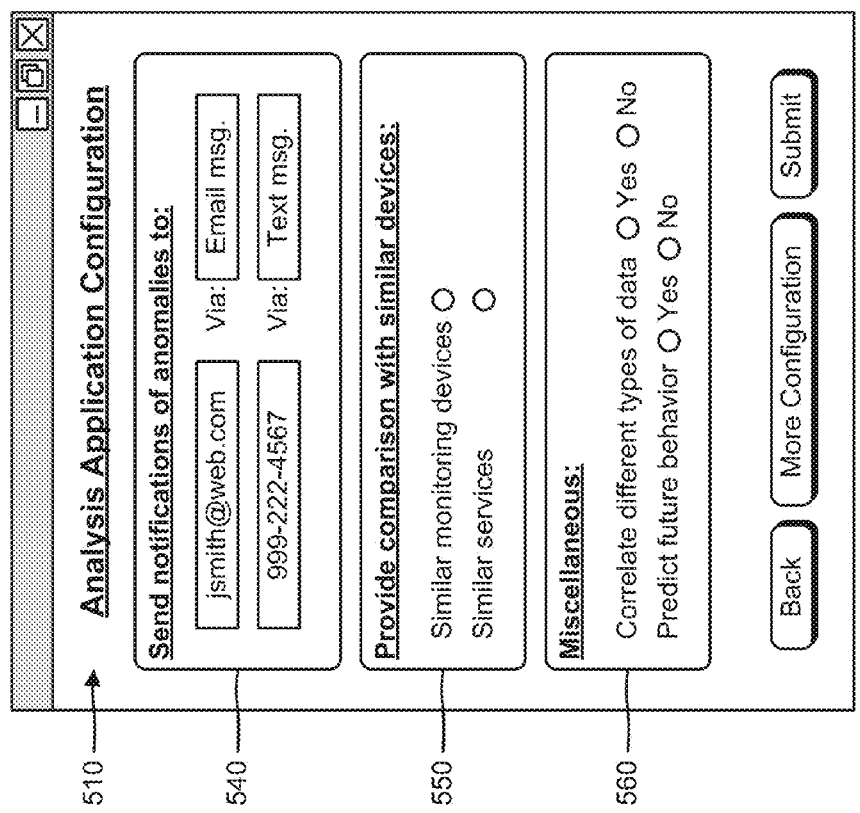

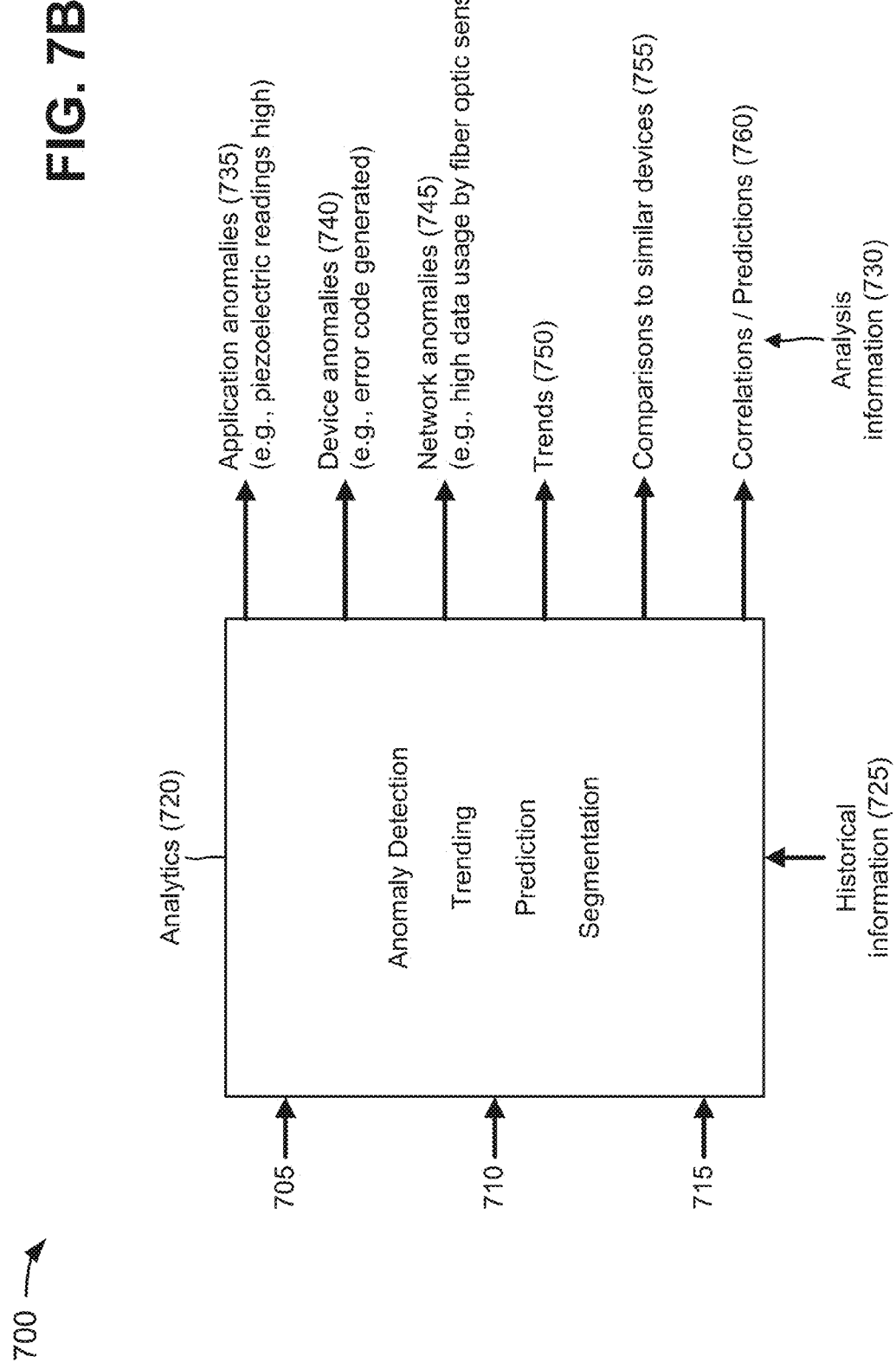

FIG. 7F

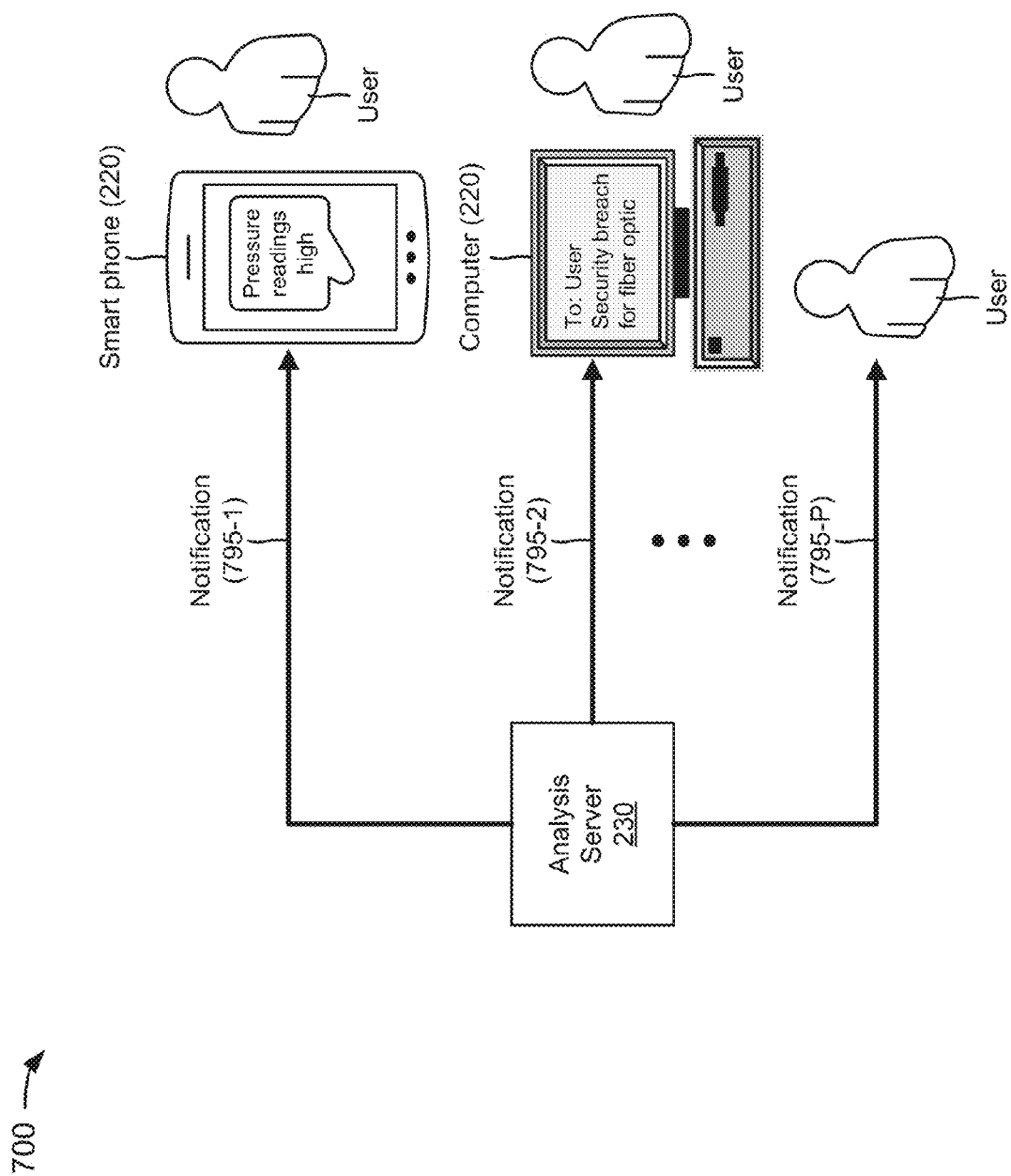

SCALABLE FRAMEWORK FOR MANAGING CIVIL STRUCTURE MONITORING DEVICES

BACKGROUND

Major civil structures, such as roads, bridges, buildings, etc. may experience faults and/or failures due to wear and tear, a natural disaster (e.g., an earthquake, a tornado, etc.), etc. Many civil structures are in need of repair and/or maintenance, but engineers typically rely upon manual inspections, active monitoring devices, and/or passive monitoring devices to determine when civil structures are in need of repair and/or maintenance.

BRIEF DESCRIPTION OF THE DRAWINGS

FIG. 1 is a diagram of an overview of an example implementation described herein;

FIG. 2 is a diagram of an example environment in which systems and/or methods described herein may be implemented;

FIG. 3 is a diagram of example components of a device that may correspond to one or more of the devices of the environment depicted in FIG. 2;

FIG. 4 is a flow chart of an example process for receiving and configuring an analysis application for a user device;

FIGS. 5A and 5B are diagrams of example user interfaces that may be used in connection with the example process shown in FIG. 4;

FIGS. 7A-7G are diagrams of an example relating to the example process shown in FIG. 6.

DETAILED DESCRIPTION OF PREFERRED EMBODIMENTS

Figure 5A:
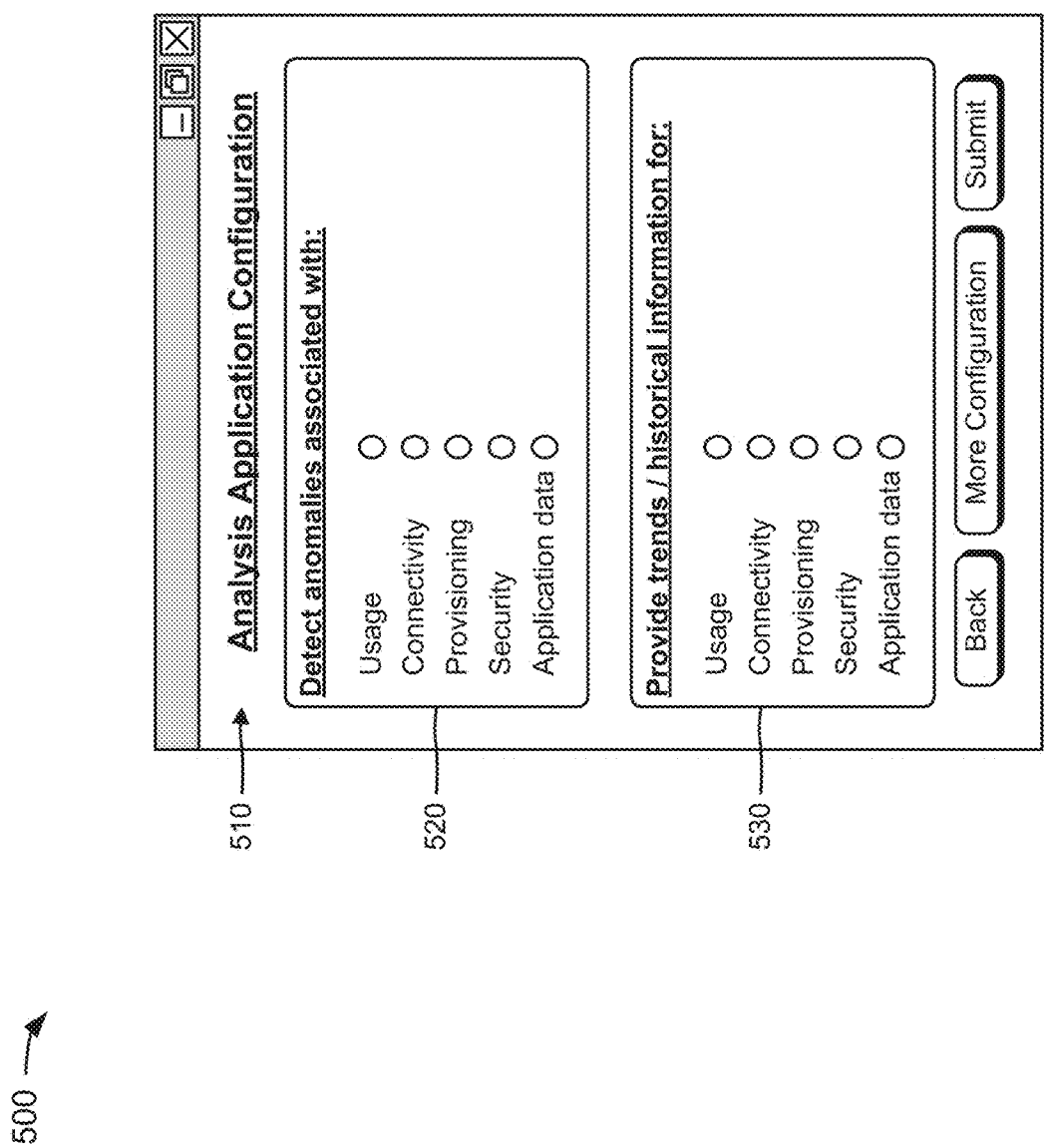

The following detailed description refers to the accompanying drawings. The same reference numbers in different drawings may identify the same or similar elements.

Some existing civil structures are provided with monitoring devices, such as accelerometers, piezoelectric sensors, fiber optic sensors, displacement transducers, strain gauges, thermometers, micro-electro mechanical systems (MEMS), etc., and may provide valuable information about the behavior of a civil structure and/or environmental conditions at a location of the civil structure. Such monitoring devices are becoming more and more prevalent today for monitoring civil structures. An entity (e.g., a utility company, an engineering company, a government agency, etc.) associated with the monitoring devices may perform schedule-based or preventative maintenance of the civil structures in order to ensure that the civil structures are safe. However, most monitoring devices are manually inspected and are not interconnected with a network. Therefore, obtaining information from the monitoring devices requires travelling to the locations of the monitoring devices in order to manually inspect the monitoring devices.

FIG. 1 is a diagram of an overview of an example implementation 100 described herein. In example implementation 100, assume that multiple monitoring devices are associated with a network and corresponding civil structures (e.g., bridges, buildings, etc.). As shown in FIG. 1, the monitoring devices may generate monitored information, and may utilize the network to provide the monitored information to an analysis server and/or a user device associated with the analysis server. The monitored information may include network data (e.g., information associated with usage, connectivity, provisioning, etc. of the network by/for the monitoring devices); device data (e.g., information associated with operation of the monitoring devices, models of the monitoring devices, etc.); and/or application data (e.g., temperature readings, pressure readings, stress or strain readings, etc.). In some implementations, a user (e.g., associated with an entity, such as a utility company, an engineering company, a government agency, etc.) of the user device may utilize the application data to monitor the civil structures in real time.

As further shown in FIG. 1, the analysis server may receive the monitored information from the monitoring devices. The analysis server may perform an analysis of the monitored information, in near real time (e.g., real time or approximately real time), real time, or batch time, via anomaly detection, trending, prediction, segmentation, etc. In some implementations, the analysis server may perform a particular analysis for monitored information received from monitoring devices associated with a particular entity. For example, certain monitoring devices may be associated with a user device of a government agency, and the analysis server may perform an analysis for monitored information received from the certain monitoring devices. As further shown in FIG. 1, the analysis server may generate analysis information based on the analysis of the monitored information, and may provide the analysis information, for display, to the user device.

In some implementations, the analysis server may enable an entity (e.g., the government agency) to access or receive analysis information that is customized for the entity. For example, as shown in FIG. 1, the analysis server may provide, for display, a dashboard to the user device associated with the government agency. The dashboard may include analysis information that is customized for the government agency, such as information associated with anomalous readings received by monitoring devices of the government agency (e.g., which may be indicative of a problem with a civil structure). For example, as shown in FIG. 1, the dashboard may indicate that monitoring device number "12345" is receiving a high pressure reading, that monitoring device number "67890" is receiving a high temperature reading, that monitoring device number "75432" is indicating a shift in a civil structure, etc. Such information may enable the government agency to identify civil structures that require repair and/or maintenance, and to correct the identified civil structures.

Systems and/or methods described herein may provide a framework for managing civil structure monitoring devices. The systems and/or methods may enable the entities to manage civil structures based on an analysis (e.g., anomaly detection, diagnosis, trending, prediction, segmentations, prognostics, etc.) of information generated by the monitoring devices. The systems and/or methods may enable the entities to identify potential faults and/or failures in civil structures, and to perform condition-based maintenance on the identified civil structures, which may significantly reduce costs for the entities. Additionally, or alternatively, the systems and/or methods may manage the monitoring devices for the entities, which may also reduce costs for the entities.

As used herein, the term user is intended to be broadly interpreted to include a user device, or a user of a user device. The term entity, as used herein, is intended to be broadly interpreted to include a business, an organization, a government agency, a user device, a user of a user device, etc.

The term civil structure, as used herein, is intended to be broadly interpreted to include transport infrastructure (e.g., road and highway networks; bridges; tunnels; culverts; retaining walls; street lights; traffic lights; curbs; sidewalks; mass transit systems, such as commuter rail systems, subways, tramways, trolleys, etc.; railways; canals; lighthouses; airports; etc.); energy infrastructure (e.g., an electrical power network; natural gas pipelines, storage, and distribution terminals; petroleum pipelines, including associated storage and distribution terminals; coal handling facilities; steam or hot water production and distribution networks; electric vehicle networks; etc.); water management infrastructure (e.g., drinking water supply, including a system of pipes, storage reservoirs, pumps, valves, filtration and treatment equipment and meters; sewage collection systems; drainage systems; irrigation systems; dams; dikes; levees; seawalls; breakwaters; floodgates; etc.); communications infrastructure (e.g., telephone networks; mobile phone networks; television and radio transmission stations; cable television networks; the Internet; undersea cables; etc.); etc.

FIG. 2 is a diagram of an example environment 200 in which systems and/or methods described herein may be implemented. As illustrated, environment 200 may include monitoring devices 210 (referred to collectively as "monitoring devices 210," and individually as "monitoring device 210"), a user device 220, an analysis server 230, and a network 240. Devices/networks of environment 200 may interconnect via wired connections, wireless connections, or a combination of wired and wireless connections.

Monitoring device 210 may include a device that is capable of monitoring a physical characteristic of a civil structure, a condition associated with a location of a civil structure, or the like. In some implementations, monitoring device 210 may include an accelerometer, a piezoelectric sensor, a fiber optic sensor, a displacement transducer, a strain gauge, a thermometer, a MEMS, a magnetostrictive sensor, an interferometric sensor, a level sensing station, an anemometer, a vibration sensor, etc. In some implementations, monitoring device 210 may wirelessly communicate over network 240 with user device 210 and/or analysis server 230.

User device 220 may include a device that is capable of communicating over network 240 with analysis server 220. In some implementations, user device 220 may include a radiotelephone; a personal communications services (PCS) terminal that may combine, for example, a cellular radiotelephone with data processing and data communications capabilities; a smart phone; a configured television; a laptop computer; a tablet computer; a global positioning system (GPS) device; a gaming device; a set-top box (STB); or another type of computation and communication device. In some implementations, user device 220 may be associated with an entity, such as, for example, a utility company, a government agency, an engineering company, etc.

In some implementations, user device 220 may receive device data (e.g., information associated with operation of monitoring devices 210, models of monitoring devices 210, error(s) generated by monitoring devices 210, etc.) and/or application data (e.g., information output by monitoring devices 210, such as, pressure readings, temperature readings, vibration readings, etc.) from monitoring devices 210. In some implementations, the entity may utilize the device data and/or the application data based on the type of device data and/or application data. For example, if the device data includes information indicating that monitoring device 210 is experiencing an error, the entity may utilize the information to instruct a technician to check and correct monitoring device 210. In another example, if the application data includes information indicating that a bridge being monitored by monitoring device 210 has shifted, the entity may utilize the information to instruct a technician to examine the bridge (or a portion of the bridge) in detail.

Analysis server 230 may include one or more personal computers, one or more workstation computers, one or more server devices, one or more virtual machines (VMs) provided in a cloud computing environment, or one or more other types of computation and communication devices. In some implementations, analysis server 230 may be associated with an entity that manages and/or operates network 240, such as, for example, a telecommunication service provider, a television service provider, an Internet service provider, etc. In some implementations, analysis server 230 may receive the device data and the application data from monitoring devices 210, and may receive network data (e.g., information associated with usage, connectivity, provisioning, etc. of network 240 by/for monitoring devices 210) from network 240. In some implementations, a device may be provided in network 240 to detect data (e.g., the device data, the application data, and/or the network data), and to provide the detected data to analysis server 230. Analysis server 230 may perform an analysis of the received data, in near real time, real time, or batch time, via anomaly detection, trending, prediction, segmentation, etc. In some implementations, analysis server 230 may generate analysis information based on the analysis of the received data, and may provide the analysis information, for display, to user device 220.

Network 240 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, a cloud computing network, or a combination of networks.

In some implementations, network 240 may include a fourth generation (4G) cellular network that includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may be referred to as an evolved universal terrestrial radio access network (E-UTRAN). The EPC network may include an all-IP packet-switched core network that supports high-speed wireless and wireline broadband access technologies. The EPC network may allow monitoring devices 210 to access various services by connecting to the LTE network, an evolved high rate packet data (eHRPD) radio access network (RAN), and/or a wireless local area network (WLAN). The IMS network may include an architectural framework or network (e.g., a telecommunications network) for delivering IP multimedia services. The PDN may include a communications network that is based on packet switching.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for receiving and configuring an analysis application for a user device. In some implementations, one or more process blocks of FIG. 4 may be performed by user device 220. In some implementations, one or more process blocks of FIG. 4 may be performed by another device or a group of devices separate from or including user device 220, such as analysis server 230.

As shown in FIG. 4, process 400 may include providing a request for an analysis application to a server (block 410). For example, a user may cause user device 220 to provide a request for an analysis application to analysis server 230. In some implementations, the analysis application may include an application, a code snippet, a script, a widget, etc. that causes user device 220 to perform one or more functions. For example, the analysis application may enable the user to set preferences for receiving information (e.g., device data, application data, network data, etc.), associated with monitoring devices 210, that has been analyzed by analysis server 230. In some implementations, the user may cause user device 220 to access the analysis application via, for example, a user interface (such as a browser) provided by analysis server 230, or in another manner. The user may then select, using user device 220, information regarding the analysis application from the user interface to cause user device 220 to provide a request for the analysis application to analysis server 230. In some implementations, analysis server 230 may offer the analysis application to user device 220 without user device 220 providing the request for the analysis application.

As further shown in FIG. 4, process 400 may include receiving the analysis application from the server based on the request (block 420). For example, user device 220 may receive the analysis application from analysis server 230, and may store the analysis application in a memory associated with user device 220 (e.g., memory 330, FIG. 3). In some implementations, the user, of user device 220, may establish an account associated with the analysis application prior to or after receiving the analysis application. In some implementations, the analysis application may be stored in analysis server 230 (e.g., and not in user device 220), and user device 220 may access the analysis application via the user's account.

As further shown in FIG. 4, process 400 may include initiating a configuration of the analysis application (block 430). For example, the user may initiate the analysis application and identify, using user device 220, one or more preferences relating to receiving information associated with monitoring devices 210 and analyzed by analysis server 230. In some implementations, the user may identify the one or more preferences using one or more elements of a user interface provided by user device 220 and/or analysis server 230. The one or more elements may include, for example, one or more text input elements, one or more drop down menu elements, one or more checkbox elements, one or more radio button elements, and/or any other types of elements that may be used to receive information from the user.

Alternatively, or additionally, the one or more preferences may include a preference of the user with respect to the analysis application detecting anomalies associated with monitoring devices 210 and/or civil structures monitored by monitoring devices 210. For example, the analysis application may detect anomalies associated with usage, connectivity, provisioning, etc. of network 240 by/for monitoring devices 210, security associated with monitoring devices 210 (e.g., if monitoring device 210 has moved from a fixed location, this may indicate that monitoring device 210 has been stolen), application data generated by monitoring devices 210, etc.

Alternatively, or additionally, the one or more preferences may include a preference of the user with respect to the analysis application providing trends and/or historical information associated with monitoring devices 210 and/or civil structures monitored by monitoring devices 210. For example, the analysis application may determine trends and/or store historical information associated with usage, connectivity, provisioning, etc. of network 240 by/for monitoring devices 210, security associated with monitoring devices 210, errors generated by monitoring devices 210, application data generated by monitoring devices, etc.

Alternatively, or additionally, the one or more preferences may include a preference of the user with respect to the analysis application sending notifications associated with anomalies detected for monitoring devices 210 and/or civil structures monitored by monitoring devices 210. For example, the user may indicate that the analysis application is to send notifications to the user or to others associated with user device 220 (e.g., via a text message, an email message, voicemail message, a voice call, etc.).

Alternatively, or additionally, the one or more preferences may include a preference of the user with respect to the analysis application providing a comparison of monitoring devices 210 with similar devices and/or a comparison of civil structures with similar civil structures. For example, the user may indicate that the analysis application is to provide a comparison of monitoring devices 210 (and/or civil structures) with other similar monitoring devices 210 (and/or other similar civil structures), devices providing similar services as monitoring devices 210, etc.

Alternatively, or additionally, the one or more preferences may include a preference of the user with respect to the analysis application providing miscellaneous information associated with monitoring devices 210 and/or civil structures monitored by monitoring devices 210. For example, the user may indicate that the analysis application is to correlate different types of data received from monitoring devices 210, predict future behavior of monitoring devices 210 and/or civil structures monitored by monitoring devices 210, etc.

Alternatively, or additionally, a type of the account, of the user, associated with the analysis application may determine the quantity of preferences that the user is able to specify. For example, the analysis application may enable the user to specify only a portion of the above preferences or specify additional preferences based on the type of the account with which the user is associated.

As further shown in FIG. 4, process 400 may include providing information identifying one or more preferences to the server (block 440). For example, the user may cause user device 220 to provide, to analysis server 230, information identifying the one or more preferences relating to the user and provided during the configuration of the analysis application.

As further shown in FIG. 4, process 400 may include receiving configuration information from the server based on the preferences (block 450). For example, user device 220 may receive, from analysis server 230, configuration information that may be used to configure the analysis application to receive information associated with monitoring devices 210 and analyzed by analysis server 230.

In some implementations, analysis server 230 may generate the configuration information, which may be used to configure the analysis application, based on the information identifying the one or more preferences of the user. For example, the configuration information may include information that causes the analysis application to receive information associated with monitoring devices 210 and analyzed by analysis server 230.

Alternatively, or additionally, the configuration information may include information that causes analysis server 230 to detect anomalies associated with monitoring devices 210 and/or civil structures monitored by monitoring devices 210, and to provide information associated with the detected anomalies to user device 220. Alternatively, or additionally, the configuration information may include information that causes analysis server 230 to provide trends and/or historical information, associated with monitoring devices 210 and/or civil structures monitored by monitoring devices 210, to user device 220.

Alternatively, or additionally, the configuration information may include information that causes analysis server 230 to send notifications (e.g., to other users and devices other than user device 220) associated with anomalies detected by analysis server 230 for monitoring devices 210 and/or civil structures monitored by monitoring devices 210. Alternatively, or additionally, the configuration information may include information that causes analysis server 230 to perform a comparison of monitoring devices 210/civil structures with similar devices/civil structures, and to provide information associated with the comparison to user device 220. Alternatively, or additionally, the configuration information may include information that causes analysis server 230 to correlate different types of data received from monitoring devices 210, predict future behavior of monitoring devices 210 and/or civil structures monitored by monitoring devices 210, etc., and to provide the correlation and/or behavior to user device 220.

Alternatively, or additionally, the configuration information may be obtained from a data structure. In some implementations, analysis server 230 may provide, to user device 220, the configuration information independent of receiving the information identifying the one or more preferences of the user.

As further shown in FIG. 4, process 400 may include storing the configuration information and configuring the analysis application based on the configuration information (block 460). For example, the user may cause user device 220 to store all or a portion of the configuration information received from analysis server 230. The analysis application may be configured based on storing all or a portion of the configuration information. In some implementations, analysis server 230 may store all or a portion of the configuration information.

In some implementations, analysis server 230 may provide updates, to the configuration information, to user device 220 based on use of the analysis application by user device 210 and/or by other user devices 220. For example, analysis server 230 may receive updates, to the configuration information, from one or more other users and may provide the received updates to user device 220. User device 220 may store the updates to the configuration information. In some implementations, analysis server 230 may provide the updates periodically based on a preference of the user and/or based on a time frequency determined by analysis server 230. In some implementations, analysis server 230 may determine whether to provide the updates based on the type of the account associated with the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A and 5B are diagrams 500 of example user interfaces that may be used in connection with example process 400 shown in FIG. 4. In some implementations, the user interfaces of FIGS. 5A and 5B may be provided by analysis server 230 to user device 220 to enable a user to identify information (e.g., preferences) that may be used to configure the analysis application so that user device 220 receives information associated with monitoring devices 210 and analyzed by analysis server 230.

Assume that the user has previously caused user device 220 to request and download the analysis application or to log into an account associated with the analysis application. Further assume that the user causes user device 220 to install the analysis application on user device 220. When the user logs into the account or user device 220 installs the analysis application, as shown in FIG. 5A, analysis server 230 may provide a user interface 510 to user device 220, and user device 220 may display user interface 510 to the user. User interface 510 may allow the user to configure different features of the analysis application. For example, the user may identify preferences for detecting anomalies associated with monitoring devices 210, and/or civil structures monitored by monitoring devices 210, in a first configuration section 520. In some implementations, the user may indicate that the user wants the analysis application to detect anomalies associated with usage of network 240 by monitoring devices 210. In some implementations, the user may indicate that the user wants the analysis application to detect anomalies associated with connectivity to network 240 by monitoring devices 210. In some implementations, the user may indicate that the user wants the analysis application to detect anomalies associated with provisioning of network 240 for monitoring devices 210. In some implementations, the user may indicate that the user wants the analysis application to detect anomalies associated with security of monitoring devices 210, application data generated by monitoring devices 210 (e.g., and relating to the civil structures, such as anomalous temperature, pressure, vibration, displacement, stress, strain, etc. readings associated with the civil structures), etc.

As further shown in FIG. 5A, the user may identify preferences for providing trends and/or historical information, associated with monitoring devices 210, and/or civil structures monitored by monitoring devices 210, in a second configuration section 530. In some implementations, the user may indicate that the user wants the analysis application to provide trends and/or historical information associated with usage of network 240 by monitoring devices 210. In some implementations, the user may indicate that the user wants the analysis application to provide trends and/or historical information associated with connectivity to network 240 by monitoring devices 210. In some implementations, the user may indicate that the user wants the analysis application to provide trends and/or historical information associated with provisioning of network 240 for monitoring devices 210. In some implementations, the user may indicate that the user wants the analysis application to provide trends and/or historical information associated with security of monitoring devices 210, application data generated by monitoring devices 210 (e.g., trends and/or historical information for temperature, pressure, vibration, displacement, stress, strain, etc. readings associated with the civil structures), etc.

As shown in FIG. 5B, the user may identify preferences for sending notifications about anomalies, associated with monitoring devices 210 and/or civil structures monitored by monitoring devices 210, in a third configuration section 540. In some implementations, the user may indicate that the user wants the analysis application to provide a notification about the anomalies to one or more users associated with user device 220 (e.g., and an entity associated with user device 220) and may indicate a notification method (e.g., send a notification to "jsmith@web.com" via an email message and send a notification to "999-222-4567" via a text message). In some implementations, the user may indicate that the user wants the analysis application to provide a notification about the anomalies to one or more other users.

As further shown in FIG. 5B, the user may identify preferences for providing a comparison, between monitoring devices 210/civil structures and other devices/civil structures, in a fourth configuration section 550. In some implementations, the user may indicate that the user wants the analysis application to provide a comparison between monitoring devices 210 and other similar monitoring devices 210. In some implementations, the user may indicate that the user wants the analysis application to provide a comparison between a characteristic of a first civil structure and a characteristic of a second civil structure. For example, the user may wish to compare information obtained from a first monitoring device 210 that monitors stress on a first bridge with information obtained from a second monitoring device 210 that monitors stress on a second bridge or another portion of the first bridge.

As further shown in FIG. 5B, the user may identify miscellaneous preferences for the analysis application in a fifth configuration section 560. In some implementations, the user may indicate that the user wants the analysis application to correlate different types of data (e.g., device data, application data, network data, etc.) associated with monitoring devices 210 and/or civil structures monitored by monitoring devices 210. In some implementations, the user may indicate that the user wants the analysis application to predict a future behavior of monitoring devices 210 and/or civil structures monitored by monitoring devices 210 (e.g., based on the trends and/or the historical information).

Once the user has identified the preferences, user interface 510 may allow the user to select a "Submit" option to store the preferences and/or submit the preferences to analysis server 230. Analysis server 230 may then provide, to user device 220, configuration information based on the preferences.

As further shown in FIGS. 5A and 5B, user interface 510 may also allow the user to select a "Back" option to cause user device 220 to provide information regarding the analysis application. As also shown in FIGS. 5A and 5B, user interface 510 may also allow the user to select a "More Configuration" option to enable the user to identify additional information that may be used to configure the analysis application.

The number of elements of user interface 510 shown in FIGS. 5A and 5B is provided for explanatory purposes. In practice, user interface 510 may include additional elements, fewer elements, different elements, or differently arranged elements than those shown in FIGS. 5A and 5B.

Figure 6:
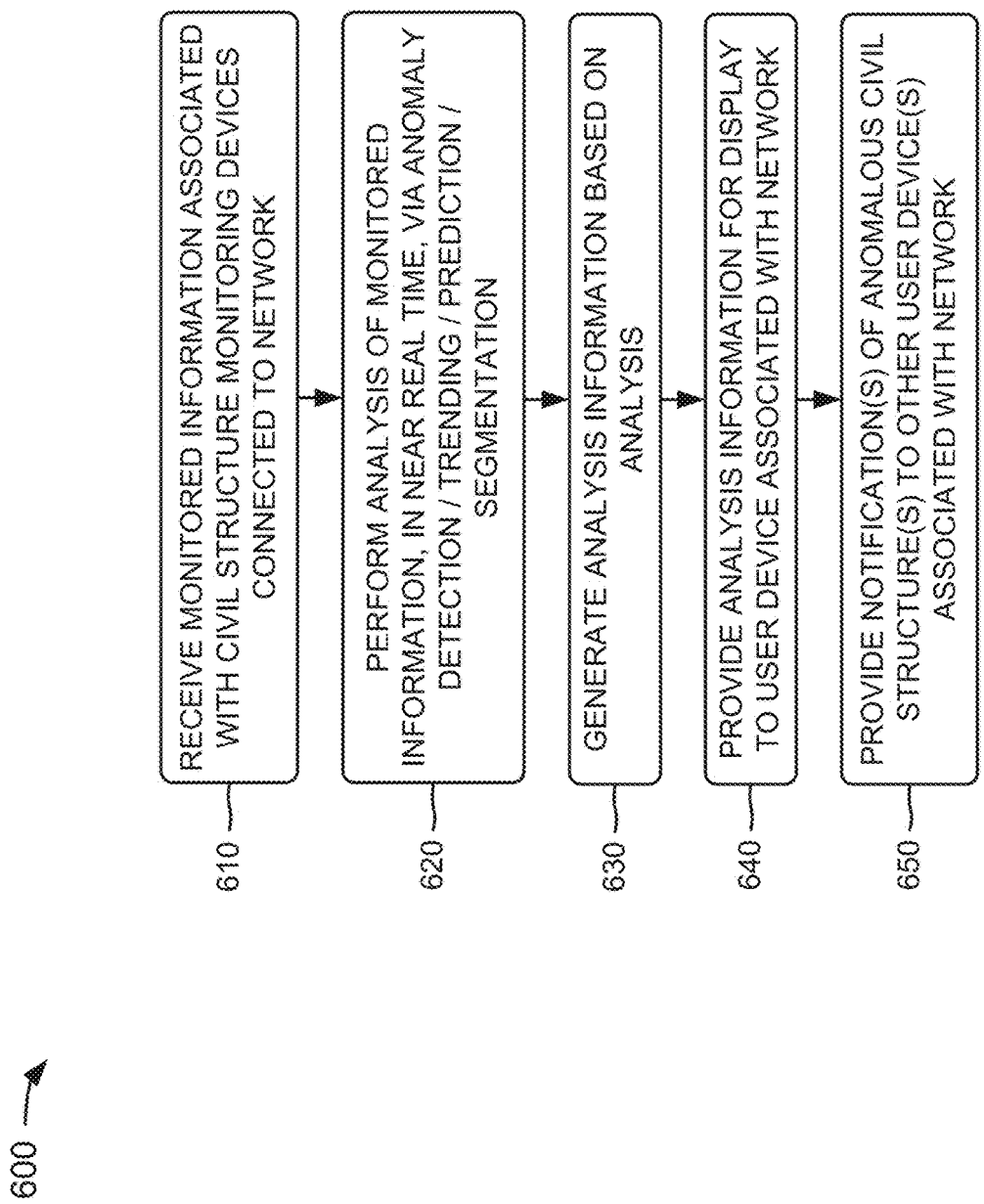
FIG. 6 is a flow chart of an example process for managing civil structure monitoring devices and analyzing information generated by the monitoring devices.

FIG. 6 is a flow chart of an example process 600 for managing civil structure monitoring devices and analyzing information generated by the monitoring devices. In some implementations, one or more process blocks of FIG. 6 may be performed by analysis server 230. In some implementations, one or more process blocks of FIG. 6 may be performed by another device or a group of devices separate from or including analysis server 230, such as user device 220.

As shown in FIG. 6, process 600 may include receiving monitored information associated with civil structure monitoring devices connected to a network (block 610). For example, multiple monitoring devices 210 may connect to network 240, and may be used to monitor one or more civil structures. Monitoring devices 210 may be associated with a particular user device 220 and a particular entity. In some implementations, analysis server 230 may monitor device data associated with monitoring devices 210, or monitoring devices 210 may provide the device data to analysis server 230. In some implementations, a device in network 240 may be configured to monitor and route the device data (or a copy of the device data) to analysis server 230. The device data may include, for example, information associated with components of monitoring devices 210, operation of monitoring devices 210, models of monitoring devices 210, errors generated by monitoring devices 210, etc.

In some implementations, monitoring devices 210 may generate application data, and may provide the application data to user device 220 and/or analysis server 230. In some implementations, analysis server 230 may monitor the application data associated with monitoring devices 210. In some implementations, a device in network 240 may be configured to monitor and route the application data (or a copy of the application data) to analysis server 230. The application data may include, for example, data generated based on operation of monitoring devices 210 (e.g., temperature readings of civil structures, pressure readings of civil structures, vibration readings of civil structures, movement or displacement readings of civil structures, etc.).

In some implementations, network data may be generated by network devices of network 240 based on monitoring devices 210 utilizing network 240 to provide the device data and/or the application data to user device 220 and/or analysis server 230. In some implementations, analysis server 230 may monitor the network data associated with monitoring devices 210. In some implementations, a device in network 240 may be configured to monitor and route the network data (or a copy of the network data) to analysis server 230. The network data may include, for example, information associated with usage of network 240 by monitoring devices 210, connectivity of monitoring devices 210 to network 240, provisioning of network 240 for monitoring devices 210, etc. In some implementations, the device data, the application data, and the network data may be referred to as monitored information, and analysis server 230 may receive the monitored information associated with monitoring devices 210.

In some implementations, analysis server 230 may pre-process the monitored information utilizing feature selection (e.g., a process of selecting a subset of relevant features for use in model construction); dimensionality reduction (e.g., a process of reducing a number of random variables under consideration); normalization (e.g., adjusting values measured on different scales to a common scale); data subsetting (e.g., retrieving portions of data that are of interest for a specific purpose); etc.

As further shown in FIG. 6, process 600 may include performing an analysis of the monitored information, in near real time, real time, or batch time, via anomaly detection, trending, prediction, and segmentation (block 620). For example, analysis server 230 may perform an analysis of the monitored information, in near real time, real time, or batch time, via analytics techniques, such as anomaly detection, trending, prediction, segregation, etc. Performance of the analysis in real time may include analysis server 230 receiving the monitored information, processing the monitored information, and generating the analysis information so that the civil structures may be managed within a particular time (e.g., in milliseconds, microseconds, seconds, etc.). Performance of the analysis in near real time may include the particular time associated with a real time analysis less a time required for analysis server 230 to generate the analysis information based on the monitored information. In some implementations, analysis server 230 may perform an analysis of the monitored information over time (e.g., not in near real time). In some implementations, analysis server 230 may utilize anomaly detection techniques to identify one or more anomalous monitoring devices 210, and/or civil structures monitored by monitoring devices 210, based on the monitored information. Anomaly detection may generally include identifying items, events, or observations that do not conform to an expected pattern or other items, events, or observations in a dataset. In some implementations, analysis server 230 may determine normal behavior patterns associated with monitoring devices 210 and/or civil structures monitored by monitoring devices 210, over time and based on the monitored information. For example, analysis server 230 may determine that monitoring devices 210 have a particular usage pattern with network 240, that monitoring devices 210 have a particular connectivity pattern with network 240, that monitoring devices 210 generate particular application data, that civil structures reach a particular temperature almost every day, etc.

Analysis server 230 may compare current monitored information with the determined normal behavior patterns in order to detect anomalous monitoring devices 210/civil structures and/or to predict abnormal behavior of monitoring devices 210/civil structures before the abnormal behavior occurs (e.g., so that preventative action may be taken). In some implementations, analysis server 230 may utilize unsupervised anomaly detection techniques, supervised anomaly detection techniques, or semi-supervised anomaly detection techniques to identify one or more anomalous monitoring devices 210, and/or civil structures monitored by monitoring devices 210, based on the monitored information. Anomaly detection may enable an entity (e.g., a government agency, an engineering company, etc.) to identify potential faults and/or failures in civil structures, and to repair or correct the faults and/or failures prior to a catastrophe.

In some implementations, analysis server 230 may utilize trending techniques (or trend analysis) to determine trends in network usage, connectivity, and/or provisioning activities of monitoring devices 210; trends in the device data; and/or trends in the application data. Trending techniques may generally include collecting information and attempting to determine a pattern, or a trend, in the information. Trending techniques may be used to predict future events and/or to estimate uncertain events in the past. In some implementations, analysis server 230 may analyze the network usage, connectivity, and/or provisioning activities of monitoring devices 210, the device data, and/or the application data, for a particular time period, in order to identify the trends in the network usage, connectivity, and/or provisioning activities, the device data, and/or the application data associated with monitoring devices 210. The trending technique may enable an entity (e.g., a government agency, an engineering company, etc.) to predict when civil structures will need repair, and to schedule maintenance accordingly.

In some implementations, analysis server 230 may utilize prediction techniques (or predictive analytics) to determine future behavior of monitoring devices 210, and/or civil structures monitored by monitoring devices 210, based on historical monitored information and/or correlated monitored information (e.g., location information associated with monitoring devices 210, destination addresses of packets generated by monitoring devices 210, radio frequency (RF) data associated with monitoring devices 210 connections to network 240, etc.). Prediction techniques may generally include a variety of techniques (e.g., statistics, modeling, machine learning, data mining, etc.) that analyze current and historical information to make predictions about future, or otherwise unknown, events. In some implementations, analysis server 230 may determine normal behavior patterns associated with monitoring devices 210 and/or civil structures monitored by monitoring devices 210, over time and based on the monitored information. Analysis server 230 may utilize the determined normal behavior patterns in order to predict future behavior of monitoring devices 210 (e.g., to predict future network usage, connectivity, and provisioning activities of monitoring devices 210) and/or civil structures monitored by monitoring devices 210. The prediction techniques may enable an entity (e.g., a government agency, an engineering company, etc.) to predict when civil structures will need repair, and to schedule maintenance accordingly.

In some implementations, analysis server 230 may utilize segmentation techniques to determine groups of monitoring devices 210/civil structures that are similar in behavior (e.g., different types of monitoring devices 210 may have similar network usage and connectivity behavior, similar civil structures may have similar characteristics, conditions, or the like). Segmentation techniques may generally include dividing or clustering items into groups that are similar in specific ways relevant to the items, such as the behavior of the items. In some implementations, analysis server 230 may analyze the network usage, connectivity, and/or provisioning activities of monitoring devices 210, the device data, and/or the application data, for a particular time period, in order to identify similarities in the network usage, connectivity, and/or provisioning activities, the device data, and/or the application data associated with monitoring devices 210 and/or civil structures monitored by monitoring devices 210. Analysis server 230 may utilize the determined similarities to group monitoring devices 210 into groups of devices with similar behavior. In some implementations, analysis server 230 may analyze the network usage, connectivity, and/or provisioning activities of monitoring devices 210, the device data, and/or the application data, for a particular time period, in order to determine correlations between different types of data (e.g., between network usage data and the application data, between the network usage data and the network connectivity data, etc.). The segmentation technique may enable an entity (e.g., a government agency, an engineering company, etc.) to compare similar civil structures in order to determine when a particular civil structure will need repair.

In some implementations, analysis server 230 may perform the analysis of the monitored information via the anomaly detection techniques, the trending techniques, the prediction techniques, the segregation techniques, and/or other analytics techniques. In some implementations, a user of user device 220 may specify which analytics techniques to perform on the monitored information. In some implementations, a number and types of analytics techniques performed by analysis server 230 on the monitored information may be based on a type of account of the user, processing power of analysis server 230, an amount of money paid by the user, etc.

As further shown in FIG. 6, process 600 may include generating analysis information based on the analysis of the monitored information (block 630). For example, analysis server 230 may generate analysis information based on the analysis of the monitored information (e.g., the device data, the application, and/or the network data) associated with monitoring devices 210. In some implementations, the analysis information may include information generated by performance of the anomaly detection techniques, the trending techniques, the prediction techniques, and/or the segmentation techniques by analysis server 230. In some implementations, analysis server 230 may store the analysis information in memory (e.g., memory 330, FIG. 3) associated with analysis server 230.

In some implementations, the analysis information may include a comparison of analyzed information, associated with monitoring devices 210 of a first civil structure, and analyzed information, associated with monitoring devices 210 of a second civil structure similar to the first civil structure. Such implementations may enable an entity to determine how the first civil structure is being maintained in comparison to the similar second civil structure, and vice versa. In some implementations, analysis server 230 may process the analysis information by filtering patterns in the analysis information, performing visualization on the analysis information, interpreting patterns in the analysis information, etc.

In some implementations, analysis server 230 may combine the results of the different analysis techniques (e.g., anomaly detection, trending, prediction, segregation, etc.) together to generate the analysis information. In some implementations, analysis server 230 may assign weights to different results of the different analysis techniques, and may combine the weighted results together to generate the analysis information. In some implementations, the analysis information may include information identifying anomalies in the application data (e.g., readings from particular monitoring devices 210 may be unusually high); information identifying anomalies in the device data (e.g., error codes may be generated by particular monitoring devices 210); information identifying anomalies in the network data (e.g., high data usage by particular monitoring devices 210); information identifying trends associated with the application data received from monitoring devices 210 (e.g., the application data may indicate that a bridge is experiencing increased stress due to a recent earthquake); information identifying comparisons between similar monitoring devices 210 and/or civil structures (e.g., application data from a monitoring device 210 at a first bridge may be compared with application data from a monitoring device 210 at a second bridge); information identifying predictions for the civil structures (e.g., monitoring devices 210 at a building may indicate that the building may need to be repaired in one year); etc.

As further shown in FIG. 6, process 600 may include providing the analysis information for display to a user device associated with the network (block 640). For example, analysis server 230 may provide the analysis information, for display, to user device 220 associated with monitoring devices 210 and/or network 240. In some implementations, analysis server 230 may generate a dashboard of user interfaces that include the analysis information, and may provide the dashboard to user device 220. In some implementations, the dashboard may include information identifying anomalous monitoring devices 210/civil structures associated with the entity; information identifying trends in the network data, the device data, and/or the application data associated with the entity's monitoring devices 210; information identifying predicted future behavior (e.g., for the network data, the device data, and/or the application data) associated with the entity's monitoring devices 210; information identifying groups of the entity's monitoring devices 210 that are similar in behavior; etc.

In some implementations, the dashboard may include information that highlights problems with monitoring devices 210 (e.g., anomalous monitoring devices 210, monitoring devices 210 that are tampered with or stolen, problem usage trends associated with particular monitoring devices 210, etc.) and/or civil structures monitored by monitoring devices 210 (e.g., civil structures that require maintenance, civil structures that require repairs, civil structures that require inspections, etc.). In such implementations, the dashboard may provide relevant predictive and diagnostic information, associated with monitoring devices 210 and/or civil structures monitored by monitoring devices 210, to the entity in a user interface. This may alert the entity about the problems with monitoring devices 210, and/or civil structures monitored by monitoring devices 210, so that the entity may take appropriate actions to correct the problems.

In some implementations, the dashboard may aid the entity in daily management of monitoring devices 210 and/or civil structures monitored by monitoring devices 210, and may enable the entity to make decisions associated with monitoring devices 210 and/or the civil structures. In some implementations, the dashboard may enable the entity to control operating costs associated with monitoring devices 210 and/or the civil structures by alerting the entity about required maintenance of problem monitoring devices 210 and/or civil structures, by identifying network issues associated with monitoring devices 210, etc. In some implementations, the dashboard may enable the entity to control asset losses and costs due to data security breaches. For example, the entity may determine that a monitoring device 210 is being stolen or tampered with if a location of monitoring device 210 changes, a connectivity pattern of monitoring device 210 changes, etc. In another example, the entity may determine data security breaches based on packet inspection, by analysis server 230, of the application data received from monitoring devices 210 (e.g., with entity's permission). In some implementations, the dashboard may enable the entity to comply with legal regulations and/or to receive regulatory approval for monitoring devices 210 and/or the civil structures. For example, the insight provided by the dashboard into the performance of monitoring devices 210 and/or the civil structures may help the entity receive approval (e.g., from regulatory agencies) for spending decisions associated with monitoring devices 210 and/or the civil structures, and may also prevent legal liabilities associated with monitoring devices 210 and/or the civil structures.

As further shown in FIG. 6, process 600 may include providing one or more notifications of anomalous monitoring devices and/or civil structure(s) to other device(s) associated with the network (block 650). For example, analysis server 230 may provide one or more notifications, associated with one or more anomalous monitoring devices 210 and/or civil structures, to other devices associated with the entity. In some implementations, the entity may designate one or more employees to receive the notifications from the analysis server 230 via a variety of notification methods (e.g., an email message, a text message, a telephone call, etc.). For example, if the entity designated Bob to receive the notification (e.g., via Bob's email address, "bob@website.com")

and Susan to receive the notification (e.g., via a text message to Susan's smart phone number "222-445-6788"), analysis server 230 may provide the notification to Bob via an email message to "bob@website.com," and may provide the notification to Susan via a text message to "222-445-6788."

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
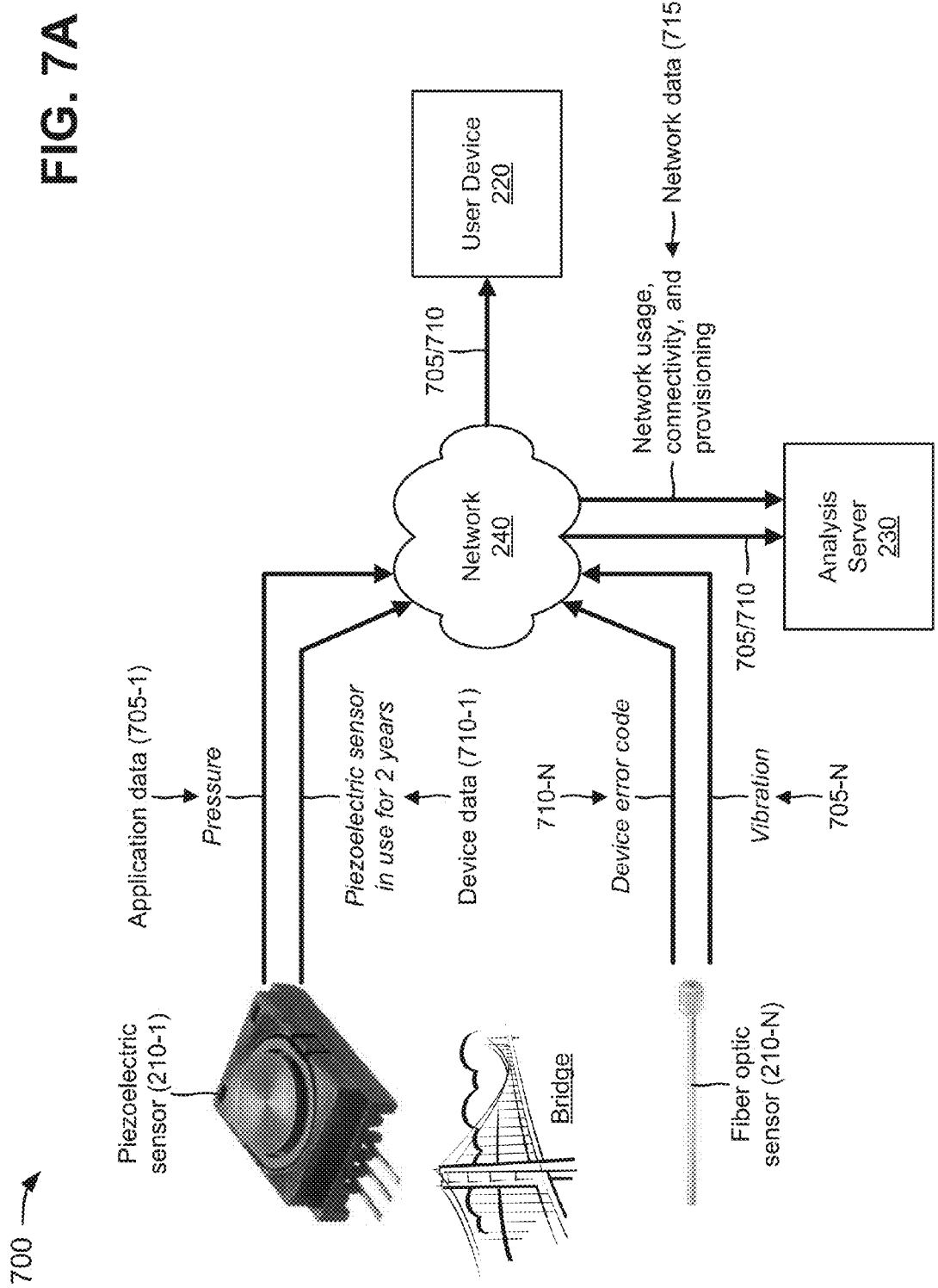

FIGS. 7A-7G are diagrams of an example 700 relating to example process 600 shown in FIG. 6. As shown in FIG. 7A, assume that multiple monitoring devices 210 (e.g., piezoelectric sensor 210-1, . . . , fiber optic sensor 210-N (N>1)) are associated with a civil structure (e.g., a bridge) and are managed and/or operated by an engineering company (e.g., XYZ Company) associated with user device 220. Piezoelectric sensor 210-1 may generate application data 705-1 (e.g., pressure readings of a civil structure) based on operation of piezoelectric sensor 210-1, and may provide application data 705-1 to user device 220 and analysis server 230, via network 240. Fiber optic sensor 210-N may generate application data 705-N (e.g., vibration readings of the civil structure) based on operation of fiber optic sensor 210-N, and may provide application data 705-N to user device 220 and analysis server 230, via network 240. Other monitoring devices 210 may generate application data 705, and may provide application data 705 to user device 220 and analysis server 230, via network 240.

As further shown in FIG. 7A, piezoelectric sensor 210-1 may generate device data 710-1 (e.g., indicating that piezoelectric sensor 210-1 has been in use for two years) based on operation of piezoelectric sensor 210-1, and may provide device data 710-1 to user device 220 and analysis server 230, via network 240. Fiber optic sensor 210-N may generate device data 710-N (e.g., a device error code) based on operation of fiber optic sensor 210-N, and may provide device data 710-N to user device 220 and analysis server 230, via network 240. Other monitoring devices 210 may generate device data 710, and may provide device data 710 to user device 220 and analysis server 230, via network 240. As further shown in FIG. 7A, utilization of network 240 to provide application data 705 and device data 710 to user device 220 may generate network data 715, and network 240 may provide network data 715 to analysis server 230. Network data 715 may include usage of network 240 by monitoring devices 210, information associated with connectivity of monitoring devices 210 to network 240, information associated with provisioning of network 240 for monitoring devices 210, etc.

As shown in FIG. 7B, analysis server 230 may include an analytics component 720 that receives application data 705, device data 710, network data 715, and/or historical information 725 (e.g., historical application data 705, device data 710, network data 715, etc. previously provided by monitoring devices 210). Analytics component 720 may perform analytics techniques (e.g., anomaly detection, trending, prediction, segmentation, etc.) on application data 705, device data 710, network data 715, and/or historical information 725 to generate analysis information 730. As further shown in FIG. 7B, analysis information 730 may include anomalies 735 associated with application data 705 (e.g., piezoelectric sensor 210-1 readings are high); anomalies 740 associated with device data 710 (e.g., error code generated by fiber optic sensor 210-N); anomalies 745 associated with network data 715 (e.g., high data usage of network 240 by fiber optic sensor 210-N); trends 750 associated with application data 705, device data 710, and/or network data 715; comparisons 755 of monitoring devices 210 with similar devices (e.g., monitoring devices of another civil structure or another portion of the same civil structure); correlations and/or predictions 760 based on application data 705, device data 710, and/or network data 715; etc. In some implementations, analysis information 730 may include network roaming patterns associated with monitoring devices 210, network usage (e.g., cell tower usage) heat maps associated with monitoring devices 210, analytics on fault tolerance (e.g., wireless backup) utilized by monitoring devices 210, results of deep packet inspection of application data 705, etc.

Figure 7C:
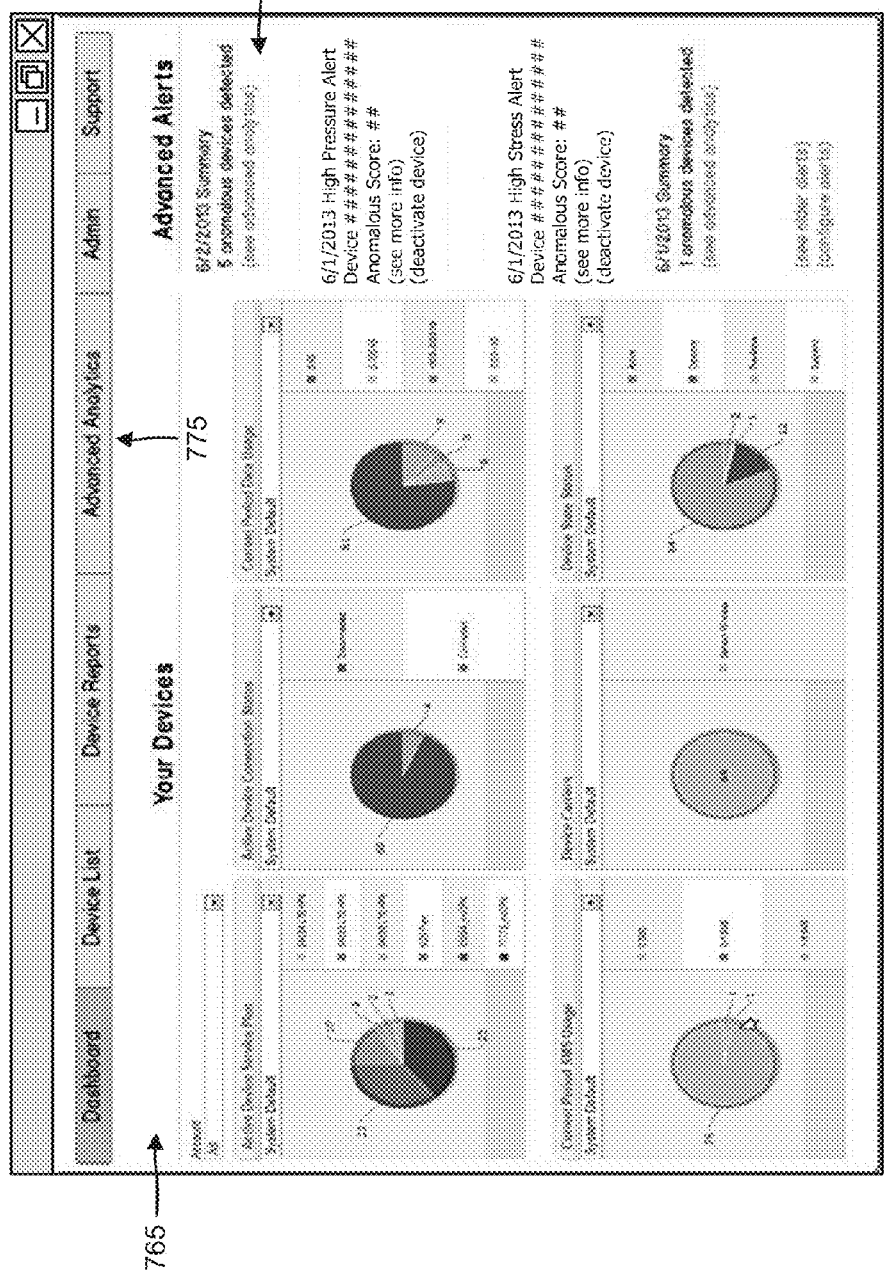

Analysis server 230 may utilize analysis information 730 to generate a first dashboard user interface 765, as shown in FIG. 7C. Analysis server 230 may provide user interface 765, for display, to user device 220 so that the engineering company may review analysis information 730. As shown in FIG. 7C, user interface 765 may include information associated with monitoring devices 210 (e.g., Your Devices), such as service plans, connection status, data usage, short message service (SMS) usage, carrier information, state status, etc. associated with monitoring devices 210. User interface 765 may also include a section 770 that displays alerts associated with particular monitoring devices 210 and/or civil structures at particular times. For example, section 770 may indicate that, on Jun. 2, 2013, five anomalous monitoring devices 210 were detected, and that, on Jun. 1, 2013, particular monitoring devices 210 detected high pressure and stress in a civil structure (e.g., the bridge). As further shown in FIG. 7C, user interface 765 may include an "Advanced Analytics" tab 775 that, when selected, may provide additional analysis information 730 for display.

Figure 7D:
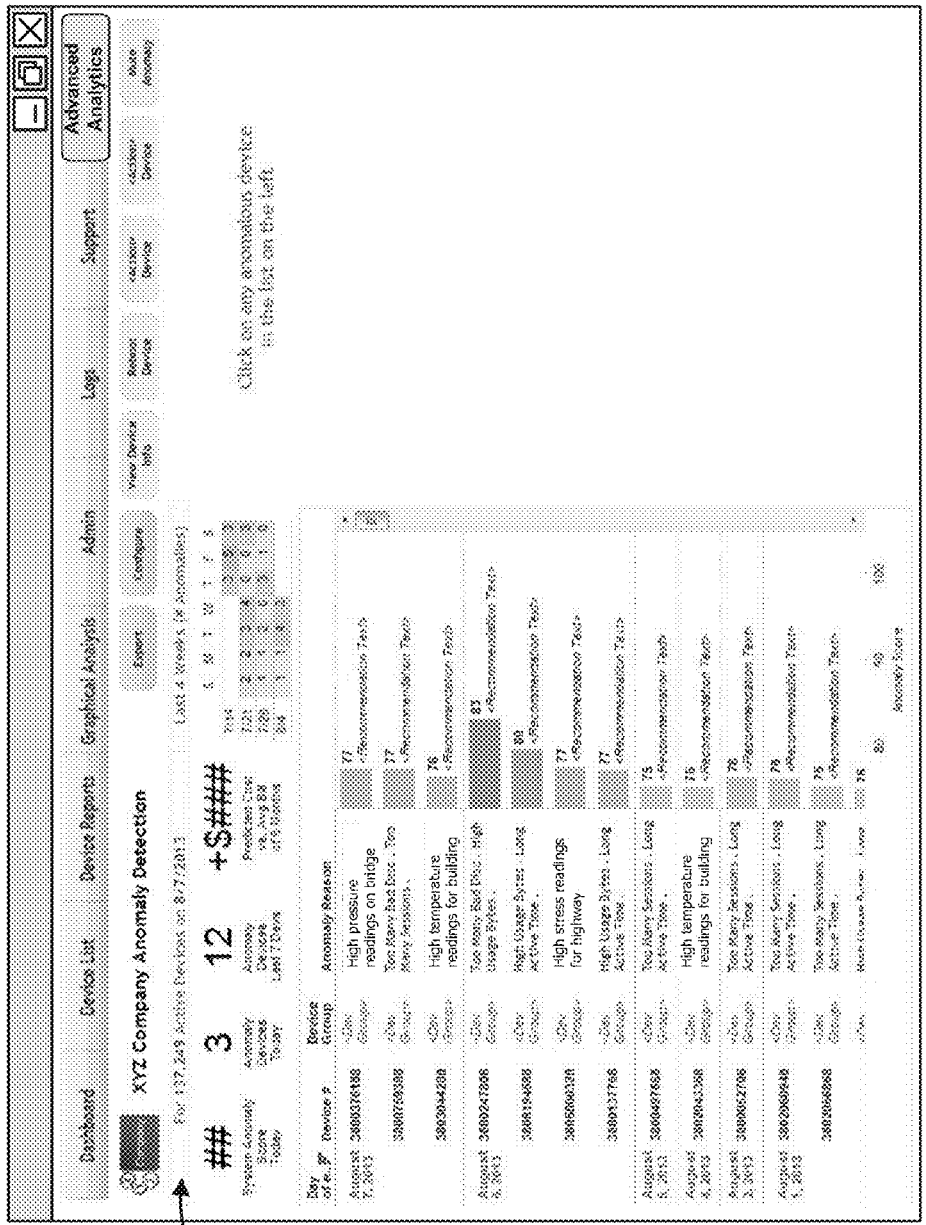

Assume that "Advanced Analytics" tab 775 is selected, and that the selection causes analysis server 230 to provide a second dashboard user interface 780, for display, by user device 220, as shown in FIG. 7D. User interface 780 may include a first section that provides information associated with monitoring devices 210 and/or civil structures on a particular day. For example, the first section may include information indicating that, on Aug. 7, 2013, XYZ Company has "137,249" active monitoring devices; an anomaly score for the engineering company on Aug. 7, 2013; a number (e.g., three) of anomalous monitoring devices 210 detected on Aug. 7, 2013 (e.g., which may be indicative of anomalous civil structures); a number (e.g., twelve) of anomalous monitoring devices 210 detected over the last seven days; a predicted cost for the engineering company for the next six months; etc. In some implementations, the anomaly score may be calculated by analysis server 230 based on a number of anomalous monitoring devices 210 detected by analysis server 230 on Aug. 7, 2013; reasons associated with the anomalies detected for the anomalous monitoring devices 210; etc.

As further shown in FIG. 7D, user interface 780 may include a second section that provides information associated with a number of anomalous monitoring devices 210 and/or civil structures detected over the last four weeks (e.g., in a calendar format). User interface 780 may include a third section that provides detailed information associated with the anomalous monitoring devices 210 and/or civil structures detected over a period of time. For example, the third section may include dates associated with when the anomalous monitoring devices 210 and/or civil structures are detected (e.g., Aug. 7, 2013, Aug. 6, 2013, etc.); device numbers associated with the anomalous monitoring devices 210 (e.g., "3800376188," "3800759388," etc.); anomaly reasons associated with the anomalous monitoring devices 210 (e.g., high data usage, high pressure readings, high temperature readings, high stress readings, etc.); and/or graphs associated with the anomalous monitoring devices 210 and/or civil structures.

Figure 7E:
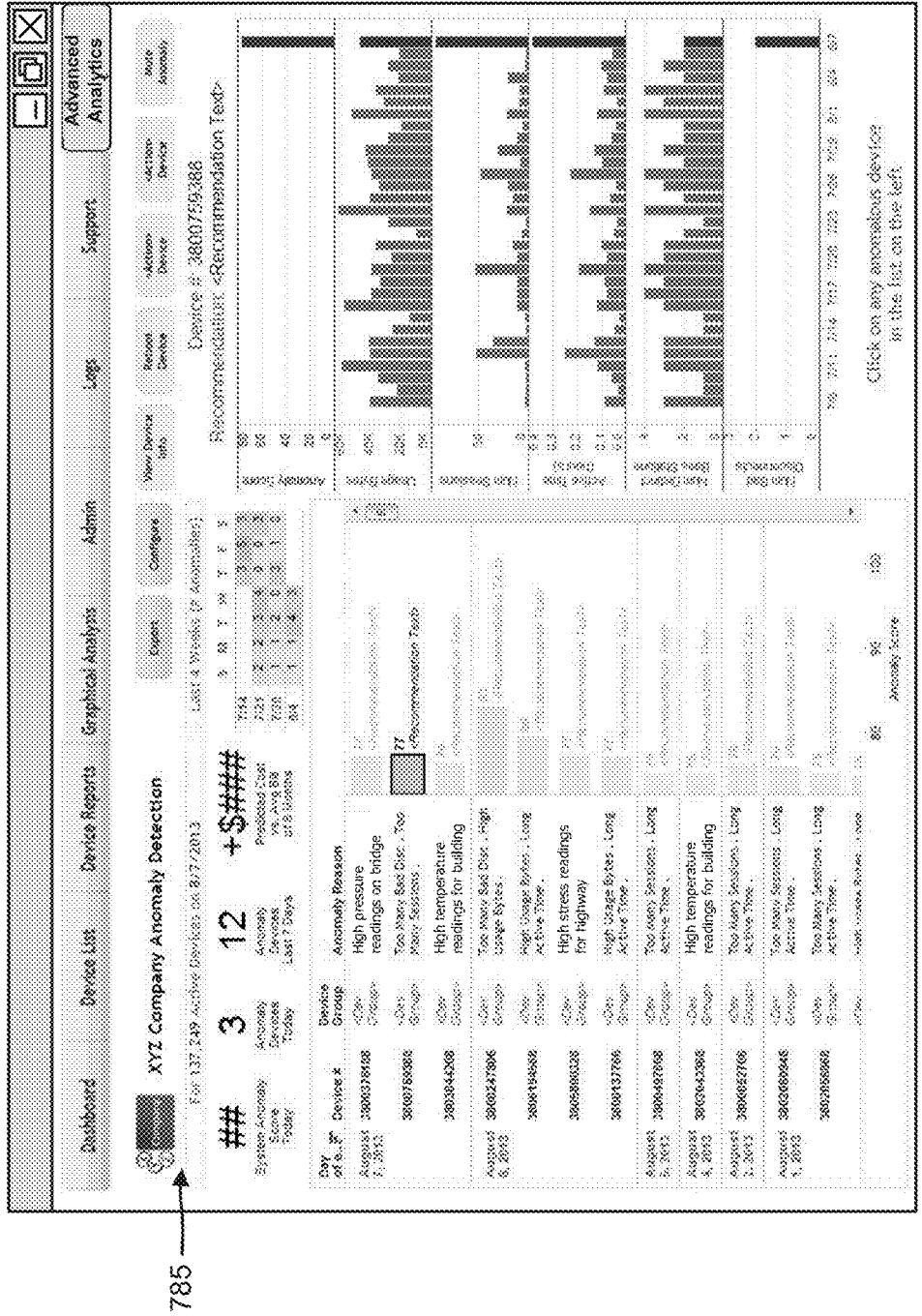

If one of the anomalous monitoring devices 210 and/or civil structures listed in the third section of user interface 780 is selected, analysis server 230 may provide a third dashboard user interface 785, for display, by user device 220, as shown in FIG. 7E. User interface 785 may include the first section, the second section, and the third section of user interface 780, and may include a fourth section that provides information associated with the selected anomalous monitoring device 210. For example, the fourth section may include information identifying an anomaly score, data usage, a number of sessions, an active time, a number of distinct base stations, a number of bad disconnects, etc. associated with the selected anomalous monitoring device 210. As further shown in FIG. 7E, user interface 785 may include mechanisms (e.g., tabs, icons, links, etc.) that enable the engineering company to return to user interface 765 (e.g., FIG. 7C), view a list of monitoring devices 210, view reports associated with monitoring devices 210, perform a graphical analysis of analysis information 730, export analysis information 730, configure one or more monitoring devices 210, view device data associated with a particular monitoring device 210, reboot a particular monitoring device 210, etc.

Figure 7F:
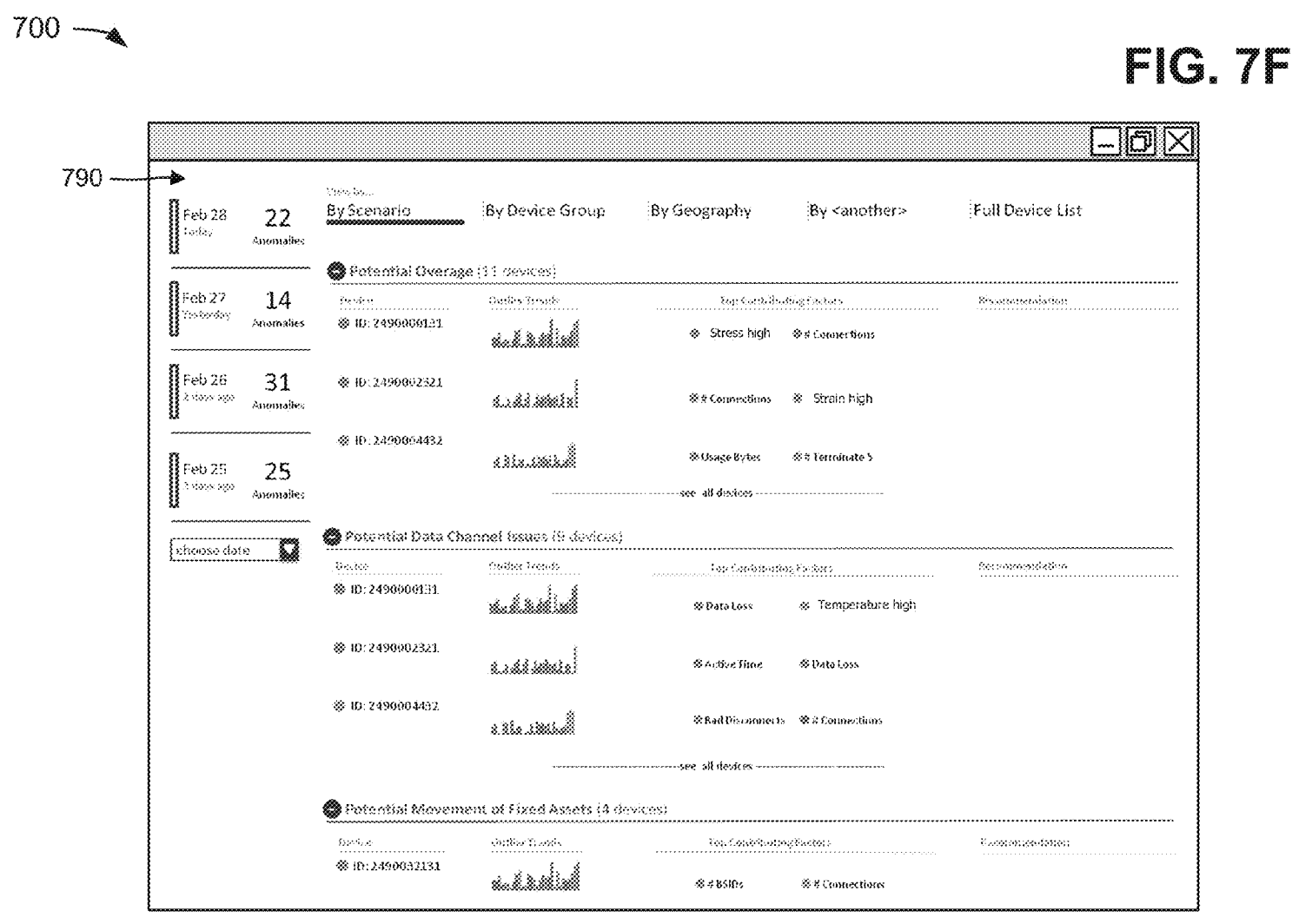

As shown in FIG. 7F, analysis server 230 may provide a fourth dashboard user interface 790, for display, by user device 220. User interface 790 may include a section that provides a number of anomalies (e.g., anomalous monitoring devices 210 and/or civil structures) detected on a particular day. For example, the section may indicate that, on February 28, twenty-two anomalous monitoring devices 210 were detected. User interface 790 may enable a user to view information associated with monitoring devices 210 based on scenario, device group, geography, etc. For example, as shown in FIG. 7F, when the information associated monitoring devices 210 is viewed based on scenario, user interface 790 may include information associated with potential overages (e.g., by eleven monitoring devices 210), potential data channel issues (e.g., by nine monitoring devices 210), potential anomalous device readings for temperature, pressure, stress, and the like, etc.

As shown in FIG. 7G, analysis server 230 may generate notifications 795-1 through 795-P (P≥1) based on analysis information 730. For example, as shown in FIG. 7G, analysis server 230 may provide notification 795-1 to a smart phone 220 associated with a user (e.g., an employee of the engineering company). Notification 795-1 may include a text message that indicates that pressure readings are high for a particular civil structure. Analysis server 230 may provide notification 795-2 to a computer 220 associated with another user (e.g., another employee of the engineering company). Notification 795-2 may include an email message that indicates a security breach for fiber optic sensor 210-N. Analysis server 230 may provide notification 795-P for display to still another user (e.g., another employee of the engineering company). Notification 795-P may include information (e.g., provided via user interface 765, FIG. 7C) that indicates high data usage for a particular monitoring device 210.

As indicated above, FIGS. 7A-7G are provided merely as an example. Other examples are possible and may differ from what was described with regard to FIGS. 7A-7G. In some implementations, the various operations described in connection with FIGS. 7A-7G may be performed automatically or at the request of a user.

Systems and/or methods described herein may provide a framework for managing civil structure monitoring devices. The systems and/or methods may enable the entities to manage civil structures based on an analysis (e.g., anomaly detection, diagnosis, trending, prediction, segmentations, prognostics, etc.) of information generated by the monitoring devices. The systems and/or methods may enable the entities to identify potential faults and/or failures in civil structures, and to perform condition-based maintenance on the identified civil structures, which may significantly reduce costs for the entities. Additionally, or alternatively, the systems and/or methods may manage the monitoring devices for the entities, which may also reduce costs for the entities.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user (e.g., via a touch screen display, a mouse, a keyboard, a keypad, voice commands, etc.). In some implementations, information provided by the user interfaces may include textual information and/or an audible form of the textual information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A method, comprising:
receiving, by a device, information associated with one or more civil structures,
the information associated with the one or more civil structures being generated by a plurality of monitoring devices that communicate with the device via a network, and
the information associated with the one or more civil structures including:
temperature information associated with the one or more civil structures,
pressure information associated with the one or more civil structures,
stress information associated with the one or more civil structures,
vibration information associated with the one or more civil structures, and
displacement information associated with the one or more civil structures;
receiving, by the device, monitoring device information associated with the plurality of monitoring devices,
the monitoring device information including:
information associated with components of the plurality of monitoring devices,
information associated with operation of the plurality of monitoring devices, and
information associated with errors generated by the plurality of monitoring devices;
receiving, by the device, network information associated with the plurality of monitoring devices,
the network information including:
information associated with usage of the network by the plurality of monitoring devices,
information associated with connectivity of the plurality of monitoring devices to the network, and
information associated with provisioning of the network for the plurality of monitoring devices;
performing, by the device, an analysis of the information associated with the one or more civil structures, the monitoring device information, and the network information, in near real time and via one or more analytics techniques;

generating, by the device, analysis information based on the analysis of the information associated with the one or more civil structures, the monitoring device information, and the network information,
  a portion of the analysis information identifying a potential issue with a particular civil structure, of the one or more civil structures, that is associated with a particular entity; and
providing, by the device and to the particular entity, the portion of the analysis information for display.

2. The method of claim 1, further comprising:
providing one or more notifications associated with the analysis information to one or more other devices associated with the device.

3. The method of claim 2, where the one or more notifications include information associated with the particular civil structure of the one or more civil structures.

4. The method of claim 1, further comprising:
determining that the particular civil structure, of the one or more civil structures, requires repair, inspection, or maintenance based on the portion of the analysis information; and
providing, for display, information indicating that the particular civil structure requires repair, inspection, or maintenance.

5. The method of claim 1, where the one or more analytics techniques include one or more of:
an anomaly detection technique to identify at least one anomalous civil structure, of the one or more civil structures, based on the information associated with the one or more civil structures,
a trending technique to identify one or more trends for the one or more civil structures based on the information associated with the one or more civil structures,
a prediction technique to predict one or more behaviors of the one or more civil structures based on the information associated with the one or more civil structures, or
a segmentation technique to group the one or more civil structures, into groups, based on the information associated with the one or more civil structures.

6. The method of claim 1, where the analysis information includes one or more of:
information associated with one or more anomalies identified in the temperature information, the pressure information, the stress information, the vibration information, or the displacement information,
information associated with one or more trends identified in the temperature information, the pressure information, the stress information, the vibration information, or the displacement information,
information associated with one or more comparisons of the temperature information, the pressure information, the stress information, the vibration information, or the displacement information, associated with the one or more civil structures, and temperature information, pressure information, stress information, vibration information, or displacement information associated with one or more other civil structures, or
information associated with one or more predictions determined based on the temperature information, the pressure information, the stress information, the vibration information, or the displacement information.

7. The method of claim 1, further comprising:
generating a dashboard user interface that visually depicts the portion of the analysis information; and
providing the dashboard user interface for display.

8. A device, comprising:
one or more processors to:
  receive information associated with one or more civil structures,
    the information associated with the one or more civil structures being generated by a plurality of monitoring devices that communicate with the device via a network, and
    the information associated with the one or more civil structures including:
      temperature information associated with the one or more civil structures,
      pressure information associated with the one or more civil structures,
      stress information associated with the one or more civil structures,
      vibration information associated with the one or more civil structures, and
      displacement information associated with the one or more civil structures;
  receive monitoring device information associated with the plurality of monitoring devices,
    the monitoring device information including:
      information associated with components of the plurality of monitoring devices,
      information associated with operation of the plurality of monitoring devices, and
      information associated with errors generated by the plurality of monitoring devices;
  receive network information associated with the plurality of monitoring devices,
    the network information including:
      information associated with usage of the network by the plurality of monitoring devices,
      information associated with connectivity of the plurality of monitoring devices to the network, and
      information associated with provisioning of the network for the plurality of monitoring devices;
  perform an analysis of the information associated with the one or more civil structures, the monitoring device information, and the network information, via one or more analytics techniques and in near real time;
  generate analysis information based on the analysis of the information associated with the one or more civil structures, the monitoring device information, and the network information,
    a portion of the analysis information identifying a potential issue with a particular civil structure, of the one or more civil structures, that is associated with a particular entity;
  store the analysis information; and
  provide, to the particular entity, the portion of the analysis information for display.

9. The device of claim 8, where the one or more processors are further to:
provide at least one notification associated with the analysis information to at least one other device, associated with the device, via an email message, a text message, a voicemail message, or a voice call.

10. The device of claim 9, where the at least one notification includes information associated with the particular civil structure of the one or more civil structures.

11. The device of claim 8, where each of the one or more civil structures includes a structure associated with one of:
a transport infrastructure,
an energy infrastructure,
a water management infrastructure, or
a communications infrastructure.

12. The device of claim 8, where the one or more analytics techniques include at least one of:
an anomaly detection technique to identify at least one anomalous civil structure, of the one or more civil structures, based on the information associated with the one or more civil structures,
a trending technique to identify one or more trends for the one or more civil structures based on the information associated with the one or more civil structures,
a prediction technique to predict one or more behaviors of the one or more civil structures based on the information associated with the one or more civil structures, or
a segmentation technique to group the one or more civil structures, into groups, based on the information associated with the one or more civil structures.

13. The device of claim 8, where the analysis information includes at least one of:
information associated with one or more anomalies identified in the temperature information, the pressure information, the stress information, the vibration information, or the displacement information,
information associated with one or more trends identified in the temperature information, the pressure information, the stress information, the vibration information, or the displacement information,
information associated with one or more comparisons of the temperature information, the pressure information, the stress information, the vibration information, or the displacement information, associated with the one or more civil structures, and temperature information, pressure information, stress information, vibration information, or displacement information associated with one or more other civil structures, or
information associated with one or more predictions determined based on the temperature information, the pressure information, the stress information, the vibration information, or the displacement information.

14. The device of claim 8, where the one or more processors are further to:
generate a dashboard user interface that visually depicts the portion of the analysis information, and
provide the dashboard user interface for display.

15. A computer-readable medium for storing instructions, the instructions comprising:
one or more instructions that, when executed by one or more processors of a device, cause the one or more processors to:
receive information associated with one or more civil structures,
the information associated with the one or more civil structures being generated by a plurality of monitoring devices connected via a network, and
the information associated with the one or more civil structures including:
temperature information associated with the one or more civil structures,
pressure information associated with the one or more civil structures,
stress information associated with the one or more civil structures,
vibration information associated with the one or more civil structures, and
displacement information associated with the one or more civil structures, and
each of the one or more civil structures including a structure associated with one of:
a transport infrastructure,
an energy infrastructure,
a water management infrastructure, or
a communications infrastructure;
receive monitoring device information associated with the plurality of monitoring devices,
the monitoring device information including:
information associated with components of the plurality of monitoring devices,
information associated with operation of the plurality of monitoring devices, and
information associated with errors generated by the plurality of monitoring devices;
receive network information associated with the plurality of monitoring devices,
the network information including:
information associated with usage of the network by the plurality of monitoring devices,
information associated with connectivity of the plurality of monitoring devices to the network, and
information associated with provisioning of the network for the plurality of monitoring devices;
perform an analysis of the information associated with the one or more civil structures, the monitoring device information, and the network information, in near real time and via one or more analytics techniques;
generate analysis information based on the analysis of the information associated with the one or more civil structures, the monitoring device information, and the network information,
a portion of the analysis information identifying a potential issue with a particular civil structure, of the one or more civil structures, that is associated with a particular entity; and
provide the portion of the analysis information for display to the particular entity.

16. The computer-readable medium of claim 15, where the instructions further comprise:
one or more instructions that, when executed by the one or more processors, cause the one or more processors to:
provide one or more notifications associated with the analysis information to one or more other devices associated with the device.

17. The computer-readable medium of claim 16, where the one or more notifications include:
information associated with the particular civil structure of the one or more civil structures.

18. The computer-readable medium of claim 15, where the instructions further comprise:
one or more instructions that, when executed by the one or more processors, cause the one or more processors to:
determine that the particular civil structure, of the one or more civil structures, requires repair, inspection, or maintenance based on the portion of the analysis information; and provide for display information indicating that the particular civil structure requires repair, inspection, or maintenance.

19. The computer-readable medium of claim 15, where the one or more analytics techniques include at least one of:
   an anomaly detection technique to identify at least one anomalous civil structure, of the one or more civil structures, based on the information associated with the one or more civil structures,
   a trending technique to identify one or more trends for the one or more civil structures based on the information associated with the one or more civil structures,
   a prediction technique to predict one or more behaviors of the one or more civil structures based on the information associated with the one or more civil structures, or
   a segmentation technique to group the one or more civil structures, into groups, based on the information associated with the one or more civil structures.

20. The computer-readable medium of claim 15, where the analysis information includes at least one of:
   information associated with one or more anomalies identified in the temperature information, the pressure information, the stress information, the vibration information, or the displacement information,
   information associated with one or more trends identified in the temperature information, the pressure information, the stress information, the vibration information, or the displacement information,
   information associated with one or more comparisons of the temperature information, the pressure information, the stress information, the vibration information, or the displacement information, associated with the one or more civil structures, and temperature information, pressure information, stress information, vibration information, or displacement information associated with one or more other civil structures, or
   information associated with one or more predictions determined based on the temperature information, the pressure information, the stress information, the vibration information, or the displacement information.

* * * * *